US010994224B2

(12) United States Patent
Bell et al.

(10) Patent No.: US 10,994,224 B2
(45) Date of Patent: *May 4, 2021

(54) FRACTIONATOR ANNULAR DRAIN APPARATUS AND METHOD

(71) Applicant: THOUGHT PRESERVE, LLC, Fallbrook, CA (US)

(72) Inventors: David A. Bell, Farmington, UT (US); C. Michael Miller, Anaconda, MT (US); Kristen Tucker, Midwest City, OK (US); John Michael Higley, Brigham City, UT (US)

(73) Assignee: THOUGHT PRESERVE, LLC, Fallbrook, CA (US)

(*) Notice: Subject to any disclaimer, the term of this patent is extended or adjusted under 35 U.S.C. 154(b) by 210 days.

This patent is subject to a terminal disclaimer.

(21) Appl. No.: 16/217,294

(22) Filed: Dec. 12, 2018

(65) Prior Publication Data
US 2019/0126168 A1 May 2, 2019

Related U.S. Application Data

(62) Division of application No. 15/234,216, filed on Aug. 11, 2016, now Pat. No. 10,159,914.
(Continued)

(51) Int. Cl.
*B01D 17/02* (2006.01)
*B01D 21/00* (2006.01)
(Continued)

(52) U.S. Cl.
CPC ..... *B01D 17/0214* (2013.01); *B01D 21/0024* (2013.01); *B01D 21/2444* (2013.01);
(Continued)

(58) Field of Classification Search
CPC .......... B01D 2221/04; C02F 2001/007; C02F 2103/10; C02F 2201/008
See application file for complete search history.

(56) References Cited

U.S. PATENT DOCUMENTS 3,139,054 A * 6/1964 Van Heusen ............ B63G 8/08
114/334
3,535,884 A * 10/1970 Chaney ................... E21B 15/02
405/210
(Continued)

FOREIGN PATENT DOCUMENTS

GB 2547044 * 9/2017 ............. E21B 43/34

OTHER PUBLICATIONS

Adler Tank Rentals http://www.adlertankrentals.com/products/tanks/closed-top/21000-cal-frac, Sep. 29, 2016.
(Continued)

*Primary Examiner* — Ana M Fortuna
(74) *Attorney, Agent, or Firm* — Pate Baird, PLLC

(57) ABSTRACT

A tank system may be conventional and fixed, or mobile, such as a fracking fluid or other tank trailer. A drain port thereof is fitted with an adapter connecting a snorkel system to drain liquids from near the top of the liquid level in the tank. A snorkel head at the extreme distal end of a tube near the longitudinal center of the tank is suspended by a system of buoys. A flow field controller plate resists formation of vortices near the snorkel head, so it can operate as near the surface as possible, withdrawing the highest grade oil efficiently. At its exit, the proximal end of the tube drains oil
(Continued)

through an inner conduit of an adapter at a penetration in the wall of the tank. The adapter forms an annulus around the inner conduit draining tank bottoms directly from the tank.

20 Claims, 20 Drawing Sheets

Related U.S. Application Data

(60) Provisional application No. 62/208,945, filed on Aug. 24, 2015, provisional application No. 62/259,856, filed on Nov. 25, 2015.

(51) Int. Cl.
*B01D 21/24* (2006.01)
*B01D 21/30* (2006.01)
*C02F 1/00* (2006.01)
*C02F 103/10* (2006.01)

(52) U.S. Cl.
CPC ...... *B01D 21/307* (2013.01); *C02F 2001/007* (2013.01); *C02F 2103/10* (2013.01); *C02F 2201/008* (2013.01)

(56) References Cited

U.S. PATENT DOCUMENTS

| | | | | |
|---|---|---|---|---|
| 4,396,504 | A * | 8/1983 | Tannehill | B01D 33/803 |
| | | | | 210/86 |
| 9,410,416 | B2 * | 8/2016 | McKenzie | E21B 43/36 |
| 10,159,914 | B2 * | 12/2018 | Bell | B01D 21/2444 |
| 2004/0200399 | A1 * | 10/2004 | Abdel-Maksoud | B63G 8/12 |
| | | | | 114/337 |
| 2015/0101820 | A1 * | 4/2015 | McKenzie | E21B 43/36 |
| | | | | 166/357 |
| 2017/0056787 | A1 * | 3/2017 | Bell | B01D 21/307 |
| 2018/0086402 | A1 * | 3/2018 | Hindle | B60H 1/245 |
| 2020/0061497 | A1 * | 2/2020 | Bell | B01D 21/307 |
| 2020/0072004 | A1 * | 3/2020 | Morin | E21B 21/065 |

OTHER PUBLICATIONS

E-tank http://www.etank.net/products/Tanks/10000-gallon-mini-frac-tank, Sep. 29, 2016.
Affordable Tank Rentals http://affordabletankrentals.com/frac-tank-rentals/, Sep. 29, 2016.
Exa Frac Tanks http://www.drillingbarite.com/exa_frac_tanks.htm, Sep. 29, 2016.

* cited by examiner

View A-A

Section B-B $$S = d + 2.3 \left(\frac{4}{\sqrt{9.8}\,\pi}\right)\left(\frac{Q}{d^{1.5}}\right)^{EQN1}$$

←—80a $V = A/A = Q/(\pi O^2/4)$
$S$ = Minimum Submergence
$Q$ = Flow Rate (m³/5)
$d$ = Diameter (m)
$A$ = Area (m²)
ANSI/HI 9.8 - 1998 Standard $$S(in.) = d\,(in.) + 0.574\,(Q(gpm))\left(\frac{1}{d(in.)^{1.5}}\right)^{EQN2}$$

←—80b $d_H = 4A(in^2)/P\,(in)$ = Hydraulic (effective) Diameter
$P$ = Wetted Perimeter

FIG. 25

FRACTIONATOR ANNULAR DRAIN APPARATUS AND METHOD

RELATED APPLICATIONS

This application is a divisional of U.S. patent application Ser. No. 15/234,216, filed Aug. 11, 2016; which claims the benefit of U.S. Provisional Patent Application Ser. No. 62/208,945, filed Aug. 24, 2015 and U.S. Provisional Patent Application Ser. No. 62/259,856, filed Nov. 25, 2015. All of which are hereby incorporated by reference in their entirety.

BACKGROUND

Field of the Invention

This invention relates to petroleum production and, more particularly, to novel systems and methods for separation of oil.

Background Art

Petroleum production will typically produce some quantity of petroleum, also referred to as crude, or crude oil. It will typically also produce a certain amount of water, typically constituted as brine containing salt and various other minerals. Also, natural gas (methane) and other trace gases will often result. Within these fluids may also arrive from a well head certain quantities of basic sediments, including precipitates, sand, rock chips, other solids, and so forth.

Various separation techniques exist for separating out oil from water, from solids, and from gases. However, eventually, some quantity of oil will result from the various separation processes that are below the specified purity. It may have various constituents at concentrations outside values required for sale at a specified market value. This type of oil is called sub-spec or off-spec oil. When oil markets quote a price for the purchase of crude oil, a quality is specified. That quality specification will typically specify the total amount or percentage of basic sediments (e.g., solids) and water (BS&W) permitted. Oil that does not meet that specification is either unsalable, and certainly unsalable at the market price, or must be disposed of at a lower price and in another manner.

Typically, one disposition of off-spec. oil (outside specified content) may be further processing. However, such processing is expensive and difficult. Moreover, the entire separation processes and handling processes are themselves problematic.

One need is an ability to empty a tank cleanly and completely, especially of content settled out below the species being extracted. One desire is selectively draining an individual layer from any separator cleanly (unmixed) and efficiently. Minimizing the risk of mixing separated constituents is difficult to achieve.

For example, fluid mechanics dictates that viscosity of a moving fluid entrains surrounding fluid. Withdrawing oil without entraining a nearby layer of water is a typical challenge. Draining water without entraining "bottoms" or "tank bottoms" is likewise. "Tank bottoms" are the bottommost sludge in a tank, a large fraction thereof being basic sediments of the BS&W. Cleaning and draining tank bottoms clinging to floors and walls present their own problems, as well.

BRIEF SUMMARY OF THE INVENTION

In view of the foregoing, in accordance with the invention as embodied and broadly described herein, a method and apparatus are disclosed in one embodiment of the present invention as including a tank, which may be constituted as a fixed, vertical tank or a tank trailer installed at a site. The separation tank or tank trailer may be adapted from a fracking fluid mixing tank.

In certain embodiments, apparatus and methods in accordance with the invention include a snorkel that traverses through a port near the tank bottom. Rising up through water that has separated out below oil, it passes through, and the murky interface layer or "dispersion band" between the lower water layer (brine) and the upper oil region.

In accordance with the invention, it has been found that oil need not be extracted from a separation tank or separator tank by conventional methods. Conventional methods include using the drain ports of various configurations that may already be installed in fracking fluid mixing tanks. It has been found that the conventional valving, and flange connections at the bottom extrema of tank trailers may be fitted with a new apparatus including a mating flange with a sub-sized line connected thereto.

The sub-size line has an outer diameter that is less than the inner diameter of the bottom port in a tank trailer. By connecting a new valve and flange to a lowest flange of a tank trailer, the tank trailer may be penetrated for connection of a snorkel. The snorkel is connected to fittings, including various adapters, and the like to the sealed, flanged assembly inserted into the exit port at or near the bottom of a tank trailer.

One adapter may include a central line (tube) surrounded by an outer line (annulus). The inflow areas are about equal. Thus, the sludge, constituting "bottoms" may still be drained through the annulus, even while the snorkel drain operates. Oil taken from near the top of the tank exits through the tube. "Bottoms" exit from the bottom of the tank through the annulus.

In one embodiment, a large (long) hose may connect to an adapter in fluid communication and fixed relation to an attaching flange. The adapter forms the penetration inside the inner diameter of the exit port of a tank trailer. To the adapter is secured and sealed a long extension of hose that extends from the exit port near one end, typically the back end, of a tank trailer. The snorkel line, hose, or tube will typically be sized to extend to about the center of the length of the tank trailer.

The adapter may connect to a flange of a conventional drain having an inside diameter (I.D.) of about 4 inches. A nominal three inch I.D. tube may form the snorkel line. Alternatively a smaller (e.g., two or two-and-a-half inch) line may act as the snorkel, surrounded by an annulus to drain the bottoms.

At the extreme end of that tube or line constituted by the hose extending from the adapter will be a snorkel head or simply "head." The head represents an inlet port receiving oil from as high a possible or practical in the tank. In other words, the head contains one or more openings that constitute inlets to receive oil. The head must be positioned within the proper layer, typically the uppermost layer, and preferably the uppermost extrema of the uppermost layer in a separation tank. Thereat, the snorkel may withdraw the highest quality, meaning the lightest density and highest purity, meaning the oil containing the fewest impurities.

In order to maintain the snorkel head at the proper altitude, levitation or buoyancy is needed. Typically, a snorkel head itself is formed as a tubular member connected to the line, hose, or tube ascending from the adapter at the exit port of the tank trailer. This tubular member or head is typically formed of metal and includes apertures sized and positioned to retrieve oil from a top side or upper side thereof.

For example, the contents of a separation tank are necessarily a dynamic quantity. At times, the snorkel head may rise to a position near the physical top of the separation tank. At other times, the topmost level or oil level in the separation tank is far below any top cover. The top surface of the oil interfaces with overlying air. An air region also contains some quantity of fumes, water vapor, and the like.

At times, that top oil level may drop all the way down to the tank bottoms. It has been found dangerous, damaging, and economically disastrous to allow the snorkel head to touch or draw in the tank bottoms. If the snorkel head inlet draws in tank bottoms (bottom sludge) damage to equipment is immediate, expensive, disruptive, and more. Thus, the snorkel head may have a standoff attached to offset the snorkel head from the bottom wall or floor of the separation tank, and thereby above the top surface of the tank bottoms.

Typically, a snorkel head should only descend to such a level after all water has been removed. Nevertheless, there may be occasions where oil has already been removed, and water is being removed by the snorkel. In certain embodiments, it is conceivable and within contemplation that multiple snorkels could retrieve oil through one and water through another. However, it has been found that conventional removal of water seems to serve adequately.

Water may typically be retrieved by draining out through existing ports above and spaced some distance away from the bottom wall or floor of the separation tank. Water may be drained from well below the lowest level of oil, typically defined by the dispersion band therebetween. Fracking fluid mixing tanks are already equipped with various fixed lines or pipes that extend into the tank certain distances from the ends, and may conduct fluids out.

In fact, it is possible to use such piping to remove oil. However, it has been found in accordance with the invention that removing the very best oil from the very highest location possible provides a more efficient and cost effective extraction method for separating and drawing out oil that will be within specification. Thus, it has been found that taking oil only from the very best oil available provides the benefit of improving compliance with specifications. It also permits oil therebelow to continue to dwell in the separation tank, further separating. Longer dwell times are longer separation times for water to drift downward along with basic solids, while the oil continues to separate upward.

Elevation of the snorkel head has its own problem. That problem is defined as a vortex, sometimes called a whirlpool. Most people that are familiar with a vortex from watching a bathtub drain its contents. Similarly, ponds and reservoirs in which a sub-surface drain or weir is provided the drain may also cause a vortex or whirlpool.

The flow field of water flowing toward the drain comes from a comparatively large area and volume. The cross sectional area perpendicular to the flow reduces in size as the fluid arrives closer to the drain position. Meanwhile, the pressure drop necessary to move that flow necessarily requires a differential in pressure from the farthest point away from the drain to the point of the drain.

A vortex forms if a drain is too close to a surface of the draining fluid. The natural flow tends to move in a circular pattern, in which centripetal force maintains the water at a distance from a central axis above the drain. A combination of the circular motion of the fluid and the pressure differential between the surface and the drain may tend to form a vortex. The science of vortices has been studied, and equations exist for defining vortices.

Ultimately, vortices, if allowed to draw overlying air into a drain pipe, may damage pumps drawing on the drain pipe. Moreover, even prior to damage, a pump will become less efficient if it is drawing air or other vapors along with liquids. Motors may overrun, equipment may be damaged or over heated, and other problems may result from drawing air into equipment through a vortex.

Thus, a dilemma exists for the snorkel head in accordance with the invention. It is desirable to draw oil from as high in the separation tank as possible. A vortex should be avoided. Vortex theory, meanwhile, insists that vortices may be avoided only by submerging the drain outlet a distance below the surface defined by vortex theory. That distance corresponds to a certain amount of "pressure head" defined in fluid engineering parlance. Head is typically expressed in feet, and signifies a number of feet of depth above or below a surface or other datum. Pressure head can be exchanged for pressure as force per unit area according to certain engineering equations, described in conventional textbooks. This technology is all described in conventional textbooks, and the reader is referred thereto for the definitions of terms and equations for controlling the fluid mechanics.

To lift the snorkel head to the top region of the oil layer in a separation tank, a buoy system has been engineered. The snorkel head is provided with a connector to which the buoy system is attached. The buoy system is separated a lateral distance from the snorkel head, while maintaining a minimum vertical distance. A synthetic depth is created by a circular plate that operates as a spacer plate holding the individual buoys away from one another, and at a specified distance away from the inlet or inlets in the head of the snorkel system.

The spacer plate may also be thought of as a flow field controller. Depth provides two factors to avoid vortices. The first is a broader flow field from which to draw fluid. For example more distance away from a drain necessarily creates a spherical cross section through which surrounding fluid will flow toward the drain point. That spherical cross section, as it grows, necessarily requires less velocity to pass a volumetric flow rate. Therefore, less pressure differential is required to drive fluid through that cross section.

Therefore, when one contemplates the required depth to avoid a vortex, part of that depth provides a radius away from the drain dictating a spherical cross sectional area That cross section must be sufficiently large that the velocities and required pressure differentials there across are reduced to values easily supported by gravitational forces acting on the fluid. Another benefit or factor that depth provides is a column or column height of fluid that basically constitutes head or static pressure above the drain.

In an apparatus and method in accordance with the invention, depth is an enemy to high quality of oil. Therefore, drawing oil at a depth far away from the top surface is not an option. The snorkel head needs to be placed as close to the surface as possible. Surface air is sure to flow easier than oil. Therefore, it would seem impossible to prevent vortices.

However, another governing factor in fluid mechanics is viscosity. Viscosity is a property of fluids that relates to their resistance to flow. Thus, if oil is more viscous, it has a higher viscosity, meaning a higher resistance to flow.

For example, one may think of honey as a highly viscous liquid. Oil is a viscous liquid, but not typically as viscous as honey. This is not always true, given that some crude is literally thixotropic (solid at standard temperature and pressure, and deformable only by application of a certain threshold force). However, when one thinks of gear oil (e.g., 90 weight oil) or the like, it flows comparatively slowly. Especially in contrast to standard 30 weight oil or 5 weight oil used in modern automotive engines. Thus, if oil is more viscous, it has a higher viscosity, meaning a higher resistance to flow. Viscosity works for and against a vortex.

On the one hand, higher viscosity requires more force and energy to move, and therefore more pressure or head height to move a fluid against the drag forces of surrounding fluids or solids. On the other hand higher viscosity tends to result in greater momentum transfer between adjacent molecules of the fluid, thereby transferring momentum and increasing speed or keeping the flow together.

It has been found that creating a flow field controller, solves the vortex problem. The flow field controller doubles as a spacer plate, keeping supporting buoys away from the snorkel head. It prevents the snorkel head from gaining access to air at the top surface or along the surfaces of the buoys.

The flow field controller is set at a diameter, or radius, defining a distance from the inlet of the snorkel head at which the surface of the oil can actually get access to the overlying air. Thus, in order to draw air, the snorkel must draw oil from the surface and underneath the spacer plate or flow field controller plate.

The effective depth is increased by the distance along the radius from the outer perimeter of the spacer plate to the apertures in the snorkel head suspended therebelow. This distance gives opportunity for surrounding oil to respond to the buoyancy difference between air and oil. Oil will force the air toward the surface, and replace it with heavier oil. Thus, the flow field controller controls the flow field by expanding the effective spherical distance to which flow is restricted to gain access to the apertures of the snorkel head.

In order to provide freedom of movement of the snorkel head, a connector is permitted to move quite freely with respect to the spacer plate. That is, the snorkel head may turn, incline, suspend, lie parallel, and so forth. However, the snorkel plate does maintain the connector of the snorkel head right at the center thereof at all times. Meanwhile, the radius or diameter of the spacer plate is calculated with actual depth to provide a synthetic depth or minimum flow path between the surface of the oil at the edge of the plate and the inlet to the snorkel.

That minimum flow path provides two features. One is time. Time permits oil to back flow or fill in and force out air that may be drawn into the flow field. Second, the minimum flow path provides an equalization of the distance fluid must travel to arrive at the snorkel. It effectively makes or reduces a sphere, otherwise filled with air in its top hemisphere, into a walled off lower hemisphere of liquid only.

This may be thought of another way. Imagine the inlet to the snorkel represented as the center of a sphere. At a significant depth, so deep that vortices cannot form, one may imagine the image of fluid homogeneous flowing from all directions through the surface of a sphere toward that center point of the sphere, which is the inlet of the snorkel. There is no reason, other than an obstruction, why fluids should not come equally fast from all directions through the surface of that sphere. Of course, that sphere of flow-cross-sectional area shrinks in diameter as the flow approaches the center of the sphere.

However, one may think of the liquid surface in vortex theory as the outer limit of that sphere. In fact, one may move the snorkel upward, such that the sphere becomes a hemisphere. With the snorkel at the surface, the sphere becomes a hemisphere. However, the upper end of that hemisphere constitutes air. The viscosity of air is so slight, its mass is so light, and so forth, that the snorkel will draw almost exclusively air.

Thus two extrema exist, the one in a super deep position, wherein the flow field has no surface effects, but presents a uniform sphere of flow. The other extremum is the worst case scenario. Therein, the sphere has an upper hemisphere of air and a lower hemisphere of oil. One may see that a benefit is made by repair to an apparatus and method in accordance with the invention. The circular plate closes or walls off the upper half or the upper hemisphere. Thus, air and all surrounding oil is on effectively equal terms.

It requires the same distance of travel, the same viscous drag, and the same acceleration from the cross sectional area at the maximum radius or diameter of the sphere to the smallest diameter sphere constituted around the inlet. It thereby imposes uniformity on the flow field of oil traveling to the inlet.

Passages exiting the tank are further improved, in accordance with certain aspects of the invention. The penetrations through standard tanks, such as fracking tanks, include a drain, typically of a standard size and sometimes with a standard valve. Any passage carrying any material out of the tank must necessarily pass through some penetration in the tank.

Removing each material in turn from the tank requires transition from material to material through the same penetration and valve. Time, labor, cleaning, contamination, and the like would occur in a typical conduit as it transitions from draining oil, to water, to tank bottoms.

In accordance with the invention, multiple passages may run concentrically through a single penetration. At least one annulus may surround a conduit interior thereto. An annulus may be divided about its circumference to provide multiple channels therein, but such complexity is not necessary.

In one embodiment, a first flange secures an initial conduit housing to the outside of the tank. The opposite end of the conduit housing may have another flange. In one embodiment, that flange may seal the annulus in an end plate that permits the central conduit integrated therewith to pass through.

In an alternative embodiment, a third flange on a second housing may secure to the second flange. The second flange, or structures associated with it, thereby seals the annulus with a plate or similar structure. Through such plate or other structure projects the central conduit. That central conduit may pass through the first or initial conduit housing and into the tank. In the tank it is available to connect to the line servicing the snorkel. Meanwhile, in either of these embodiments, a second passage transitions from the annulus to a connector that drains the tank volume directly through the annulus and into a line always separate from the connections and lines servicing the central conduit.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 25 is a chart illustrating an equation, in two forms, metric and English units, with definitions of parameters represented in those equations;

FIG. 26 is a perspective view of a snorkel system in accordance with the invention having an adapter for draining two flows, one through a central conduit and the other through an annular conduit around the central conduit, each arriving at a different valve and drain tube, receiver, or the like;

DETAILED DESCRIPTION OF THE PREFERRED EMBODIMENTS

Figure 1:
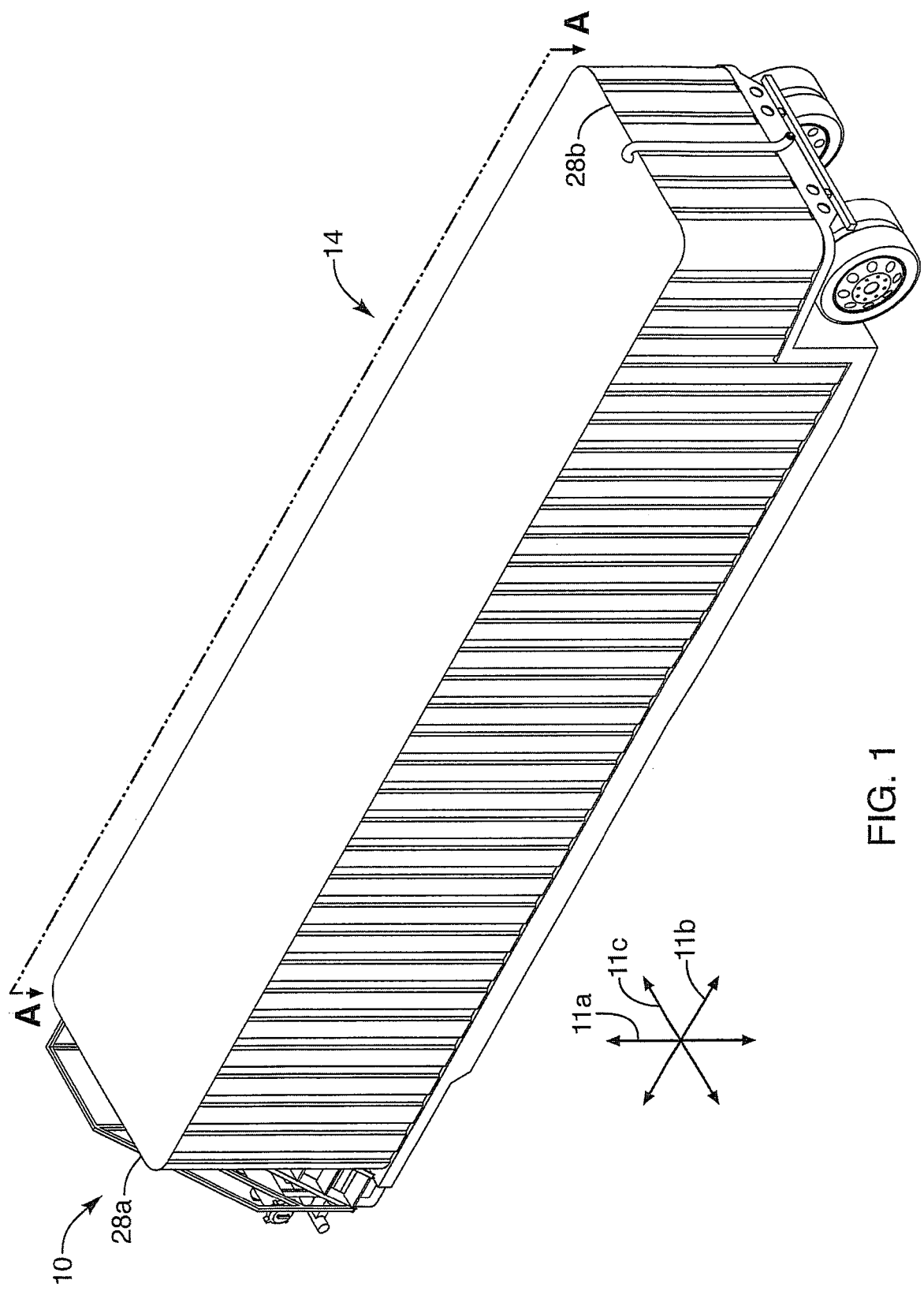
FIG. 1 is a perspective of one embodiment of a separation tank adapted from a fracking fluid mixing tank trailer.
Figure 2:
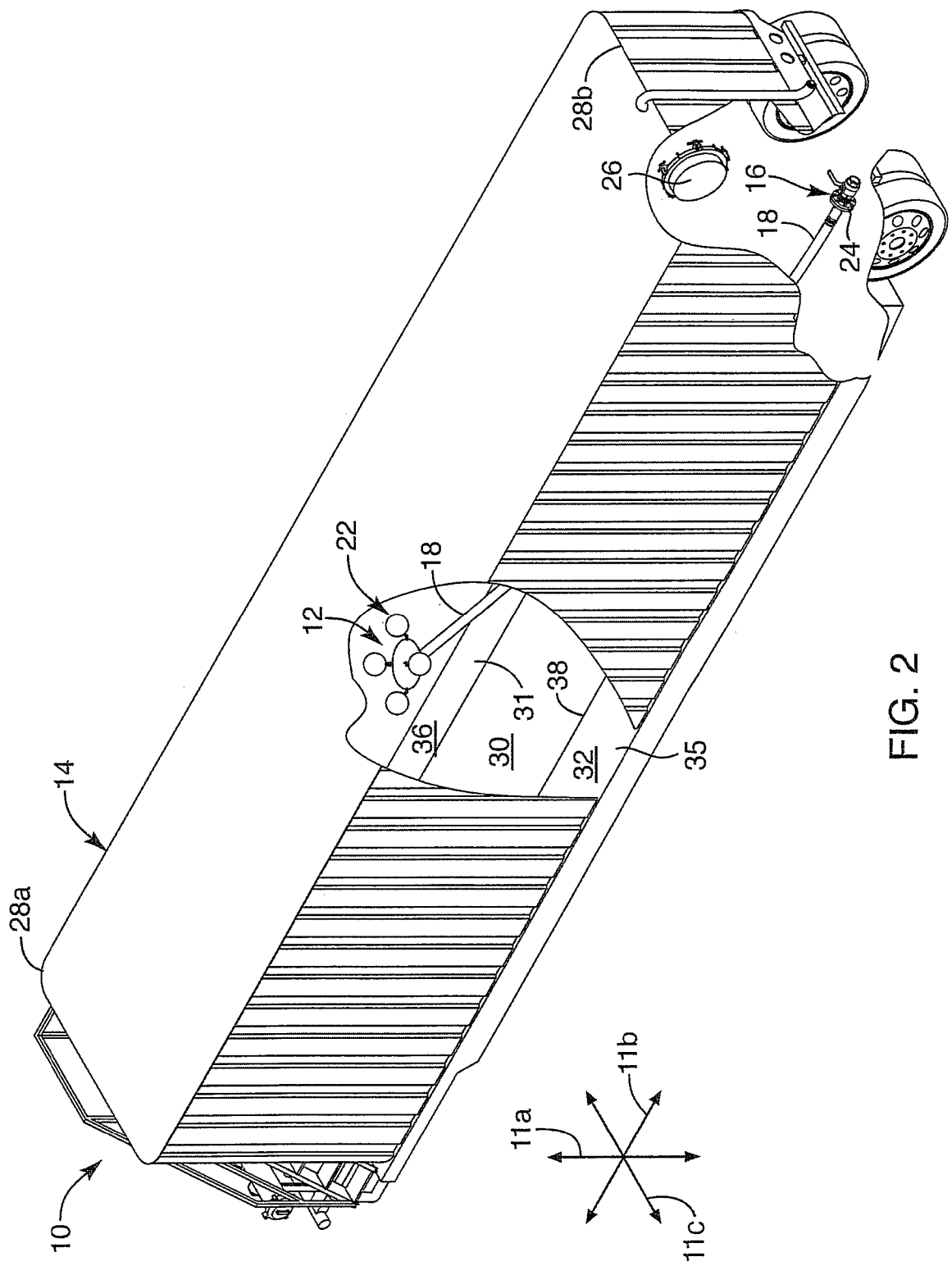
FIG. 2 is a perspective view of a partially cut away separation tank, illustrating a snorkel penetration into the tank, and its distal end system of buoys and flow field controller plate, as well as a manway by which access may be made for installation and servicing of a snorkel in accordance with the invention.
Figure 3:
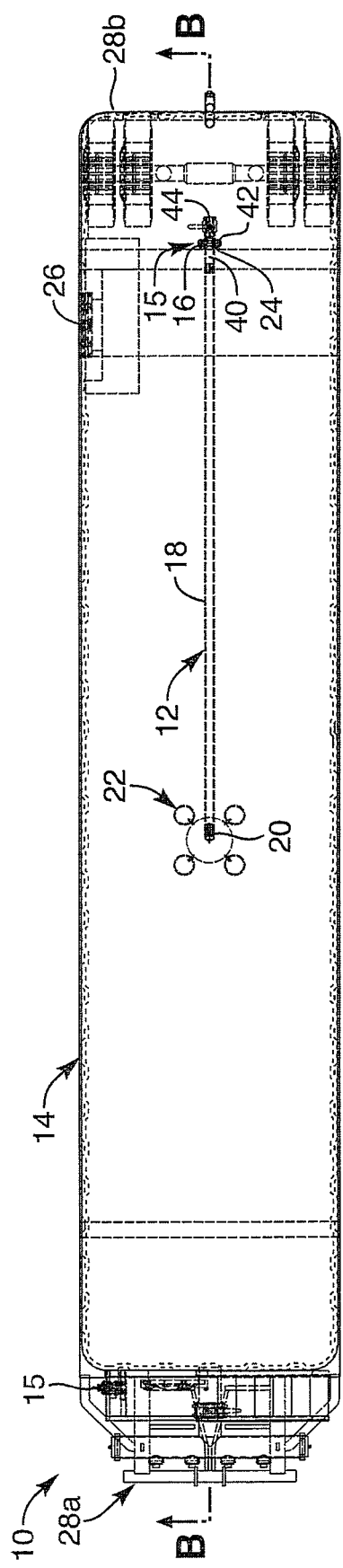
FIG. 3 is a top plan view of the systems of FIGS. 1 and 2 taken at section A-A.
Figure 4:
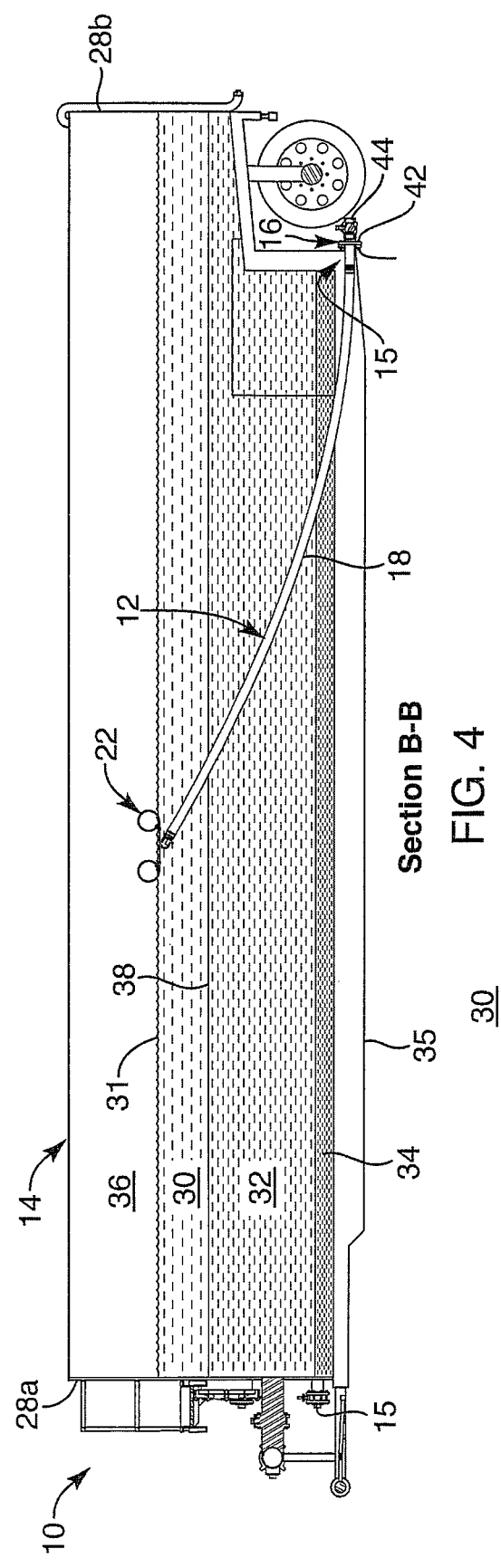
FIG. 4 is a side elevation view thereof taken at section B-B.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in one embodiment of an apparatus and method in accordance with the invention, a system 10 may provide significant improvements to separation of comparatively higher quality oil, meaning within a specification set by a refinery as a threshold level of quality for sale to that refinery. For example, refineries will determine a basic sediments and water (BSW or BS&W) qualification required for sale and purchase of crude oil.

In making that determination, the refinery may be considering the various species that will be refined out from crude oil to form various fuels, solvents, other hydrocarbons, and so forth. Water is considered a degradation and dilution of oil. Refineries most hate water due to the energy cost of vaporizing it in a fractionating column. A basic sediments are likewise problematic, causing wear, damage, fouling, and so forth, they are not desired. Nevertheless, markets control. Therefore, a price at which a refinery finds that it can purchase crude oil at a particular quality and in sufficient quantity to meet its needs will effectively determine the market.

Therefore, a system 10 and method in accordance with the invention may be built to define a vertical direction 11a, longitudinal direction 11b, and a lateral direction 11c, orthogonal to both. The directions 11 have significance, notwithstanding each is shown as having an axis 11a, 11b, 11c extending in opposite directions along a single line. The vertical direction 11a corresponds to gravity and gravitational forces. Thus, the direction 11a is the direction of buoyancy, separation, and settling. Meanwhile, the longitudinal direction 11b and the lateral direction 11c effectively define a plane that will typically represent a horizontal directions when a system 10 is level.

In the illustrated embodiment, a snorkel system 12 is a significant improvement for a tank 14, such as a tank trailer 14. Typically, a tank 14 or tank trailer 14 will include a variety of drains 15 or ports 15 as well as other fill ports, vents, and so forth. The difficulty with drains 15 is that they are problematic in management of fluid levels within the tank 14. They necessarily require flows of fluids in the longitudinal direction 11c across dozens of feet of distance.

Similarly, lateral flows toward one side or another, or toward one end 28a or the other 28b imply comparatively large distances as compared to heights in a vertical direction 11a of any particular layer of fluid. Thus, entrainment is always a problem. Entrainment is that phenomenon of fluid mechanics associated with viscosity of fluids. Viscosity in this context may be thought of as fluid frictional characteristics.

Viscosity is a fluid property and reflects momentum transfer between layers of that fluid in motion. Likewise, viscosity may affect momentum transfer between two fluids in two separate layers traveling in the same or different directions. For example, momentum transfer between fluid particles encourages quiescent fluids adjacent to moving fluids to move by transferring momentum thereto.

Similarly, fluid drag is associated with viscosity, density, distances, etc. during travel in conduits, or along surfaces. In such conditions, a solid wall need not be moving. Momentum transfer between the wall and a moving fluid brings the fluid to a halt at the surface, but establishes a boundary layer of transition between the solid boundary and a free stream of the fluid flow. Within the boundary layer, the viscosity pressure, momentum, and energy of the flow will establish a thickness. That thickness is the boundary layer in which the fluid transitions from a stationary velocity at the solid wall to a maximum bulk or free stream velocity at some distance away from that wall.

Together, the adapter system 16, line 18, which is a flexible line 18 in one currently contemplated embodiment illustrated, the head 20 that will receive fluid to be taken out of the tank 14, and the supporting buoy system 22 constitute the snorkel system 12 of the overall system 10. In a tank 14 in accordance with the invention, certain drains 15 or ports 15 may be provided with an adapter system 16. That adapter system 16 secures to the drain 15 or port 15 in order to pass therethrough. The adapter system 16 then connects to a line 18 inside the tank 14. The line leads upward to a head 20 near the top liquid surface 31. The head 20 is supported by a buoy system 22.

The adapter may have a pipe 40 or fitting 40 inside an annulus. The pipe 40 connects to the line, while the annulus is exposed to the open tank, near the floor. Outside the flange 42, the annulus and pipe 40 separate to a "bottoms" line and a "saleable oil output" line. Each is valued and pumped.

In practice, it has been found that a flanged penetration 24 defining a drain 15 or port 15 provides access for the adapter system 16. Meanwhile, a manway 16 constituted by a door of sorts that seals much like a pressure vessel. It will withstand (e.g., halt) any leakage of fluids therethrough. It provides access for personnel to work inside of the tank 14. Typically, manways 26 may be located on the top (roof) or bottom (floor) of a tank 14, or on a side wall near the top or bottom thereof, even in the end bulkhead. Meanwhile, a manway 26 may be located near the front end 28 of a tank trailer 14, or near the back end thereof, even in the end bulkhead.

Meanwhile, certain of the ports 15 may provide for introduction of production fluids. Production fluids are materials that result from petroleum production. They may include vapors, liquids, and various chemical constitutions. Thus, production fluids often include some quantity of natural gas (methane), crude oil (liquid hydrocarbons), water (typically constituted as a brine containing various salts and other chemicals in trace amounts), and basic sediments or solids such as sand, and so forth.

In the illustrated embodiment, the flanged penetration 24 provides access for introducing the adapter system 16 into the tank 14. The line 18 is typically of about the same size or outer diameter as the inner diameter of the flanged penetration 24. Nevertheless, the line 18 may actually be somewhat larger than the adapter system 16, since it may fit over a portion of the adapter system 16. Likewise, the line 18 is quite comparatively long compared to the size of the adapter system 16, meaning length thereof.

The manway 26 may open to provide access to the interior of the tank 14 for installing the line 18. Certainly, the line 18 will be secured to the adapter system 16 after the adapter 16 is inserted through an appropriate drain 15 or port 15, and preferably secured to the flanged penetration 24. Typical sealing by "O" rings, gaskets, or other types of seals may occasion installation of the adapter system 16 through the port 15 and securement to the flanged penetration 24.

It has been found to greatly ease the manufacturing process to rely on the manway 26 as an opening 26 to introduce the buoy system 22. The buoy system 22 is necessarily quite large, and certainly much larger than anything that would fit as a solid or in a solid configuration through a port 15 and flanged penetration 24. Thus, the buoy system 22 may be installed at a distal end of the line 18 before installation inside the tank 14. Alternatively, the line 18 and buoy system 22 may both be installed and interconnected inside the tank 14 after an introduction through the manway 26.

Similarly, the head 20 will typically be too large to fit through the port 15 or the flanged penetration 24. Accordingly, the head 20 may effectively be installed by passing the head 20 through the manway 26. It may either be installed already in the line 18, at the distal end thereof, or installed on the line 18 after both are introduced into the tank 14 through the manway 26.

In one currently contemplated embodiment, the adapter system 16, line 18, and head 20 may be preassembled outside of the tank 14. In other embodiments, either one or both of the adapter system 16 and head 20 may be secured to the line 18 after the line 18 is positioned inside the tank 14. One reason for installing the line 18 to the head 20 before introduction into the tank 14 is that the line 18 may simply be slipped onto the adapter system 16, not requiring any relative rotation with respect thereto.

Nevertheless, if orientation of the head 20 is important, then twisting or rotating of the line 18 is a simple matter prior to being secured to the adapter system 16. Meanwhile, however, the head 20 may be oriented and secured by inserting the head 20 into the line 18 after the line 18 is installed. Nevertheless, manipulating the line 18 to orient the head 20, after the line 18 and head 20 are secured to one another does not present a large, let alone insurmountable, challenge. Moreover, the line 18 may have a diameter that becomes much larger than the fitting 40. Such will require introduction through the manway 26.

Referring to FIGS. 1 through 4, while continuing to refer generally to FIGS. 1 through 33, a tank 14 after introduction of production fluids may separate those production fluids into different layers 30, 32, 34. Typically, the top layer 30 is an oil layer 30 represented by a top surface 31. The oil layer 30 may actually be somewhat stratified from its top surface 31 down toward the water layer 32. Again, the water layer 32 constitutes largely water. However dissolved solids, salts, and the like, as well as other trace minerals or chemicals, may also exist in the water 32.

Meanwhile, the tank "bottoms" 34 represent crud 34 or a combination of basic sediments mixed with some quantity of hydrocarbons, water, and so forth. The "tank bottoms" 34 or bottoms 34 represent the dregs 34 of the contents of the tank 14. The dregs 34 or bottoms 34 are very difficult to move, remove, and transport. In fact, one reason for the buoy system 22 and the entire snorkel system 12 is to avoid entraining material from the water layer 32 or the bottoms 34 when draining the tank 14.

Conventional methods of draining the tank 14 necessarily rely on comparatively slower processes with extensive monitoring required, lest layers 30, 32, 34 mix by entrainment, and thus degrade materials extracted therefrom.

Port locations are poorly adapted for segregated draining. Entrainment causes mixing, necessitating slow draining. Long distances exacerbate this problem.

In one embodiment, the bottoms 34 are contained by the literal bottom 35 or tank floor 35. It is a solid wall 35 at the lower extremity of the tank 14.

Meanwhile, above the oil layer 30 is a vapor region 36 or air region 36. Vapors 36 may include air, volatile organic compounds (VOC), some amount of evaporated moisture, and so forth.

The interface 38 between the oil layer 30 and the water layer 32 may actually represent a dispersion band 38. That is, typically, as water separates out of oil and oil separates out of water, each travels in an opposite direction or a direction opposite the other. Oil travels upward toward the oil layer 30 from within the water layer 32. Water travels downward through the oil layer 30 toward the water layer 32. Sediments travel downward from the oil layer 30 and the water layer 32 to arrive at the bottoms 34.

Thus, the dispersion band 38 or boundary 38 actually does not have the theoretical infinitely thin dimension. Rather, it represents a region 38 wherein oil and water in close proximity are separating from one another to travel to their respective oil layer 30 and water layer 32.

Referring to FIGS. 5 through 12, while continuing to refer generally to FIGS. 1 through 25, a system 10 in accordance with the invention may rely on the snorkel system 12 to secure to the tank 14 through a flange penetration 24 into which is fitted a fitting 40 or adapter 40. A flange 42 may be formed as a part thereof, or as an assembly therewith.

The fitting 40 or adapter 40 operates to fit inside the flange penetration 24. It needs an outer diameter that is less than the inner diameter that of the flange penetration 24 constituting the port 15 at the bottom 35 of the end 28b of the tank 14. The flange 14 is fitted to the flange penetration 24 constituting the port 15. It has been found that a valve 44 secured to the flange 42 provides for control of draining the oil layer 30 from the tank 14 through the snorkel system 12. The valve 44 may replace any other valving that would otherwise or previously been secured to the flange penetration 24.

However, in certain embodiments, the entire fitting 40 or adapter 40 may be passed through a ball valve. Nevertheless, it has been found convenient to secure the flange 42 to the flange penetration 24, thereby securing the entire adapter system 16 at the port 15 of the tank 14.

The adapter 40 may have a sufficiently small diameter to fit inside an annulus. The annulus fits inside the penetration 24. Separating into the distinct paths, the annulus and the fitting 40 drain the "tank bottoms" 34 and the snorkel line 18, respectively.

In certain embodiments, it has been found affective and convenient to rely on conventional barbed texture 46 or "hose barbs" 46 to be received into the line 18. As illustrated, barbs 46 may be secured inside the line 18 on both the proximal and distal ends by compression bands 48.

A significant feature of the snorkel system 12 is the reduction of obstructions. By making the valve 44 a ball-type valve 44, virtually no obstruction, such as turns, corners, and so forth will exist between the head 20 and a location outside the snorkel system 12. The only fluid drag source, after the head 20 would be the fluid drag against the walls (for instance inside wall or inside surface) of the snorkel system 12. However the line 18 may expand to a large diameter after its connection to the fitting 40. Alternatively the fitting 40 may be adapted by an expansion to fit a large hose inside diameter.

Another benefit of having a flexible line 18 is that the entire line 18 may flex gradually along its length in order to position the head 20 as near the top surface 31 of the oil layer 30 as possible. However, as close as possible may be thought of as representing as close as practical or reasonable. In reality, it has been found that the head 20 is best positioned a predetermined distance away from the top surface 31 of the oil layer 30. That distance is controlled by minimum vortex depth.

Speaking of extrema, it is also not beneficial, indeed damaging to processes, equipment, and downstream processing systems, methods, and equipment as well for the head 20 to ever ingest or draw in material from the tank bottoms 34 or bottoms 34. The solid content of the bottoms 34 clogs, fouls, damages, breaks, and otherwise affects dramatically and drastically most equipment.

Accordingly, it has been found important to provide a standoff 49 engineered to restrain or limit the proximity within which the head 20 can approach the bottom 35 of the tank 14. Accordingly, a standoff 49 operates in conjunction with the head 20. It operates and even more particularly with the buoy system 22 to maintain position and orientation of the head 20.

For example, in the illustrated embodiment, the standoff 49 need only provide a single dimension of spacing of the head 20 away from the floor 35 or bottom 35. One reason for this is the buoy system 22. The buoy system 22, linked to the head 20, stably maintains the orientation of the head 20. Thus, the standoff 49 spaces the head 20 away from the floor 35 or bottom 35 of the tank 14. In particular, the head 20 should not ingest bottoms 34 at any time.

The buoy system 22 may include a plate 50 engineered to provide an effective vortex depth for the head 20. For example, the plate 50 may sit below the top surface 31 of the oil layer 30 suspended by links 52 connecting it to the individual buoys 54. In the illustrated embodiments, the buoys 54 may ride partially submerged, due to their own weight, the weight of the plate 50, and the weight of the supported head 20, and line 18.

Figure 5:
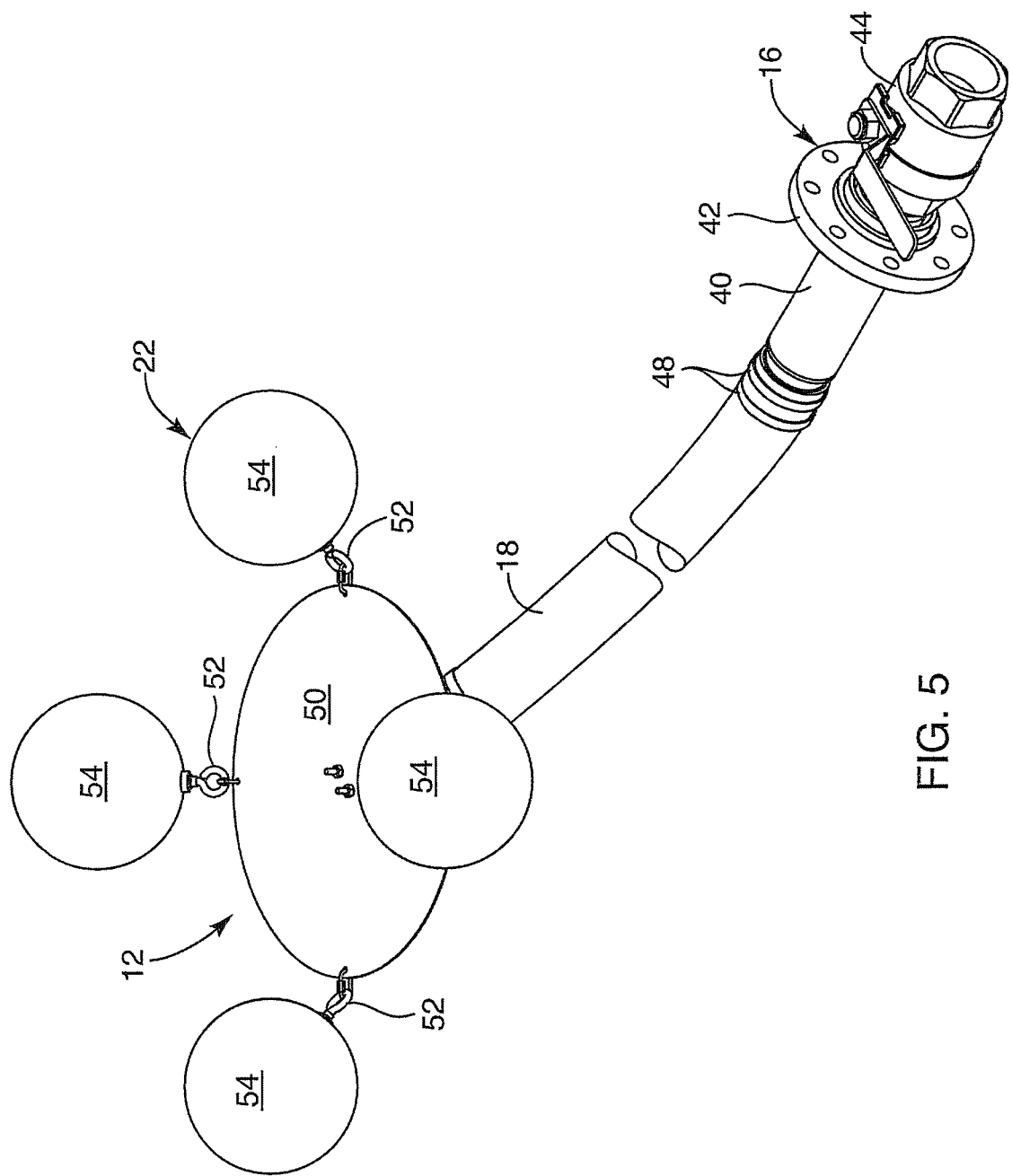
FIG. 5 is a perspective view of one embodiment of a snorkel in accordance with the invention.
Figure 6:
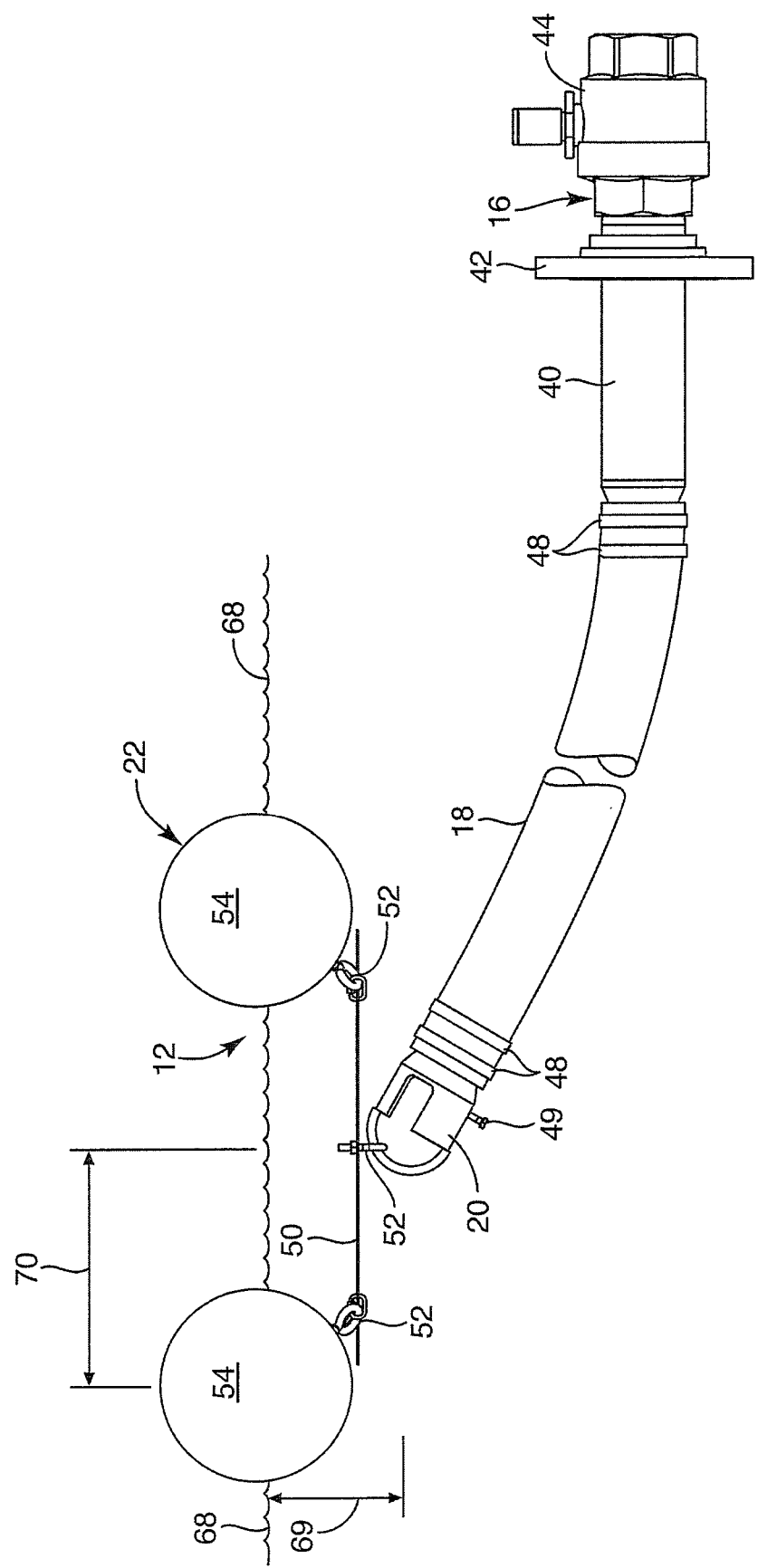
FIG. 6 is a side elevation view thereof.
Figure 7:
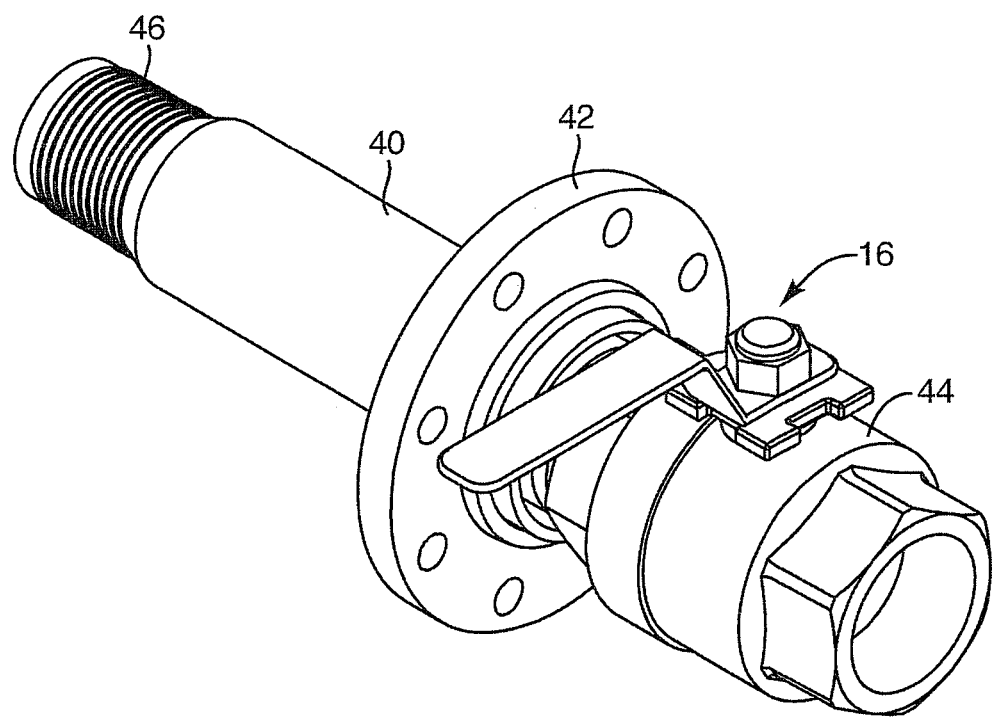
FIG. 7 is a perspective view of the details of the flange and adapter along with the controlling ball valve positioned at the entry point into the tank trailer or separation tank in accordance with the invention.
Figure 8:
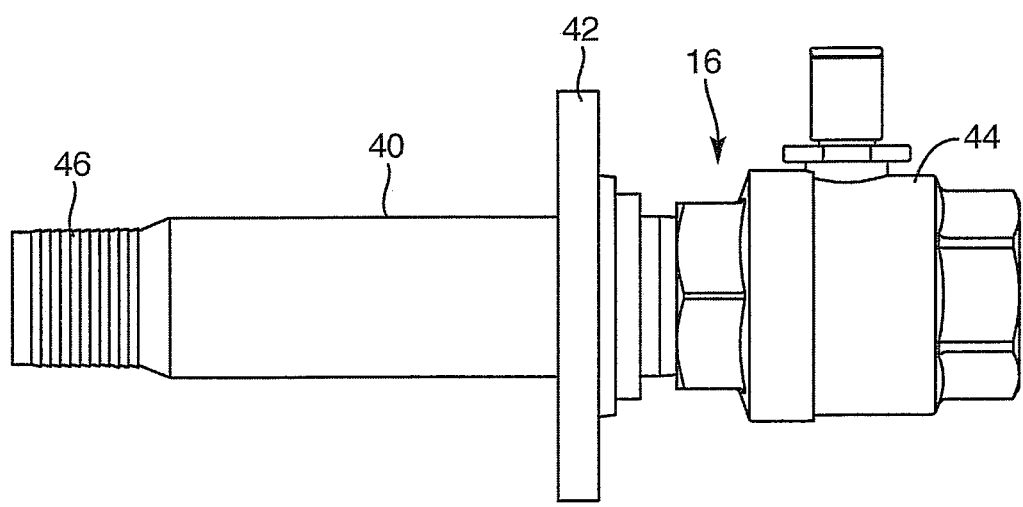
FIG. 8 is a left side elevation view thereof.
Figure 10:
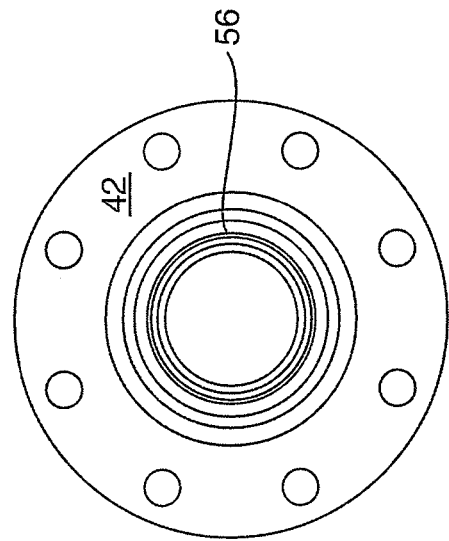
FIG. 10 is a front end elevation view thereof.
Figure 12:
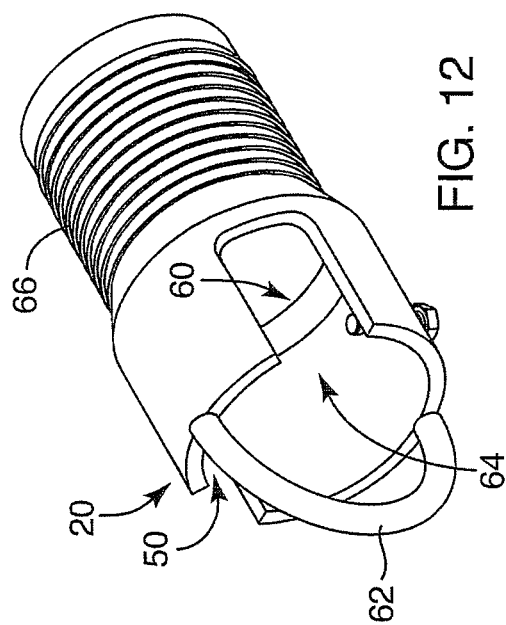
FIG. 12 is a perspective view of one embodiment of a snorkel head with its connector and apertures.
Figure 9:
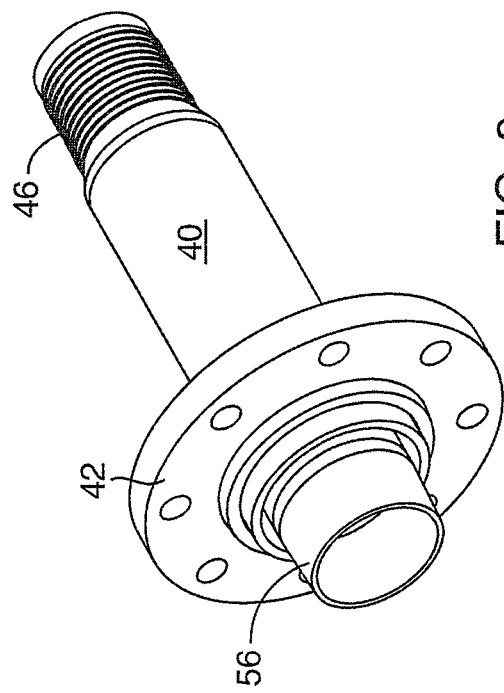
FIG. 9 is a perspective view of the flange adapter.
Figure 11:
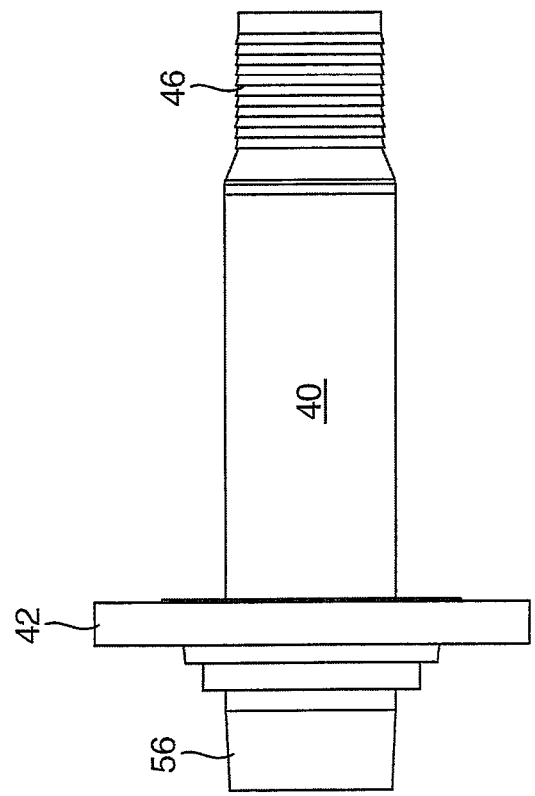
FIG. 11 is a left side elevation view thereof.
Figure 13:
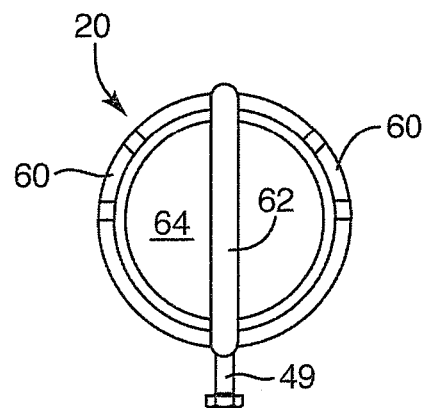
FIG. 13 is an end elevation view thereof.
Figure 14:
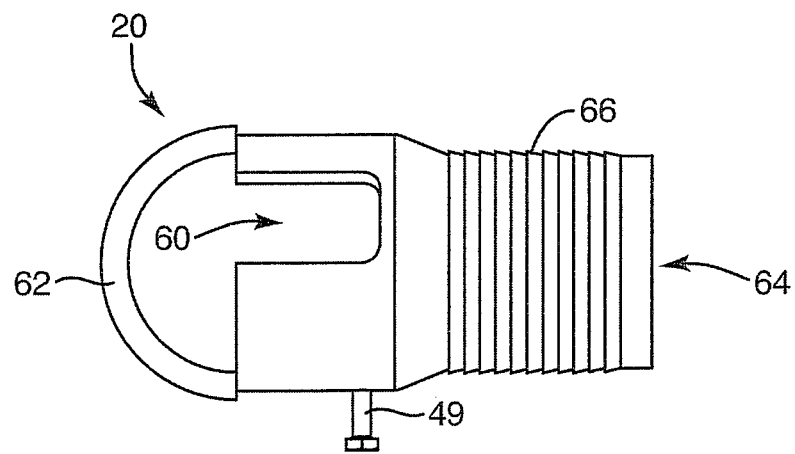
FIG. 14 is a side elevation view thereof showing the apertures on an upper half thereof.
Figure 15:
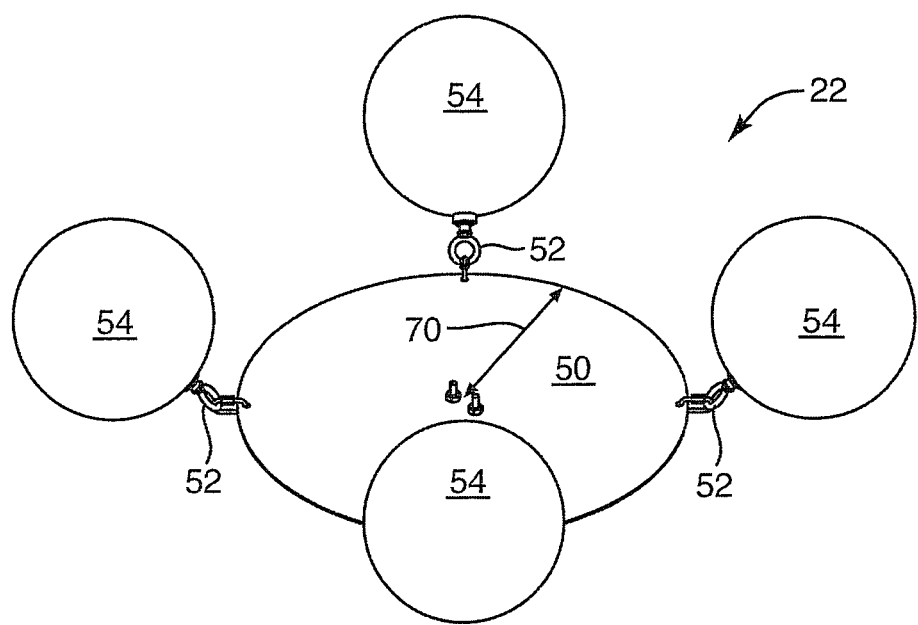
FIG. 15 is an upper perspective view of one embodiment of a buoy system in which individual buoys are connected to support a flow field controller or spacer plate.
Figure 16:
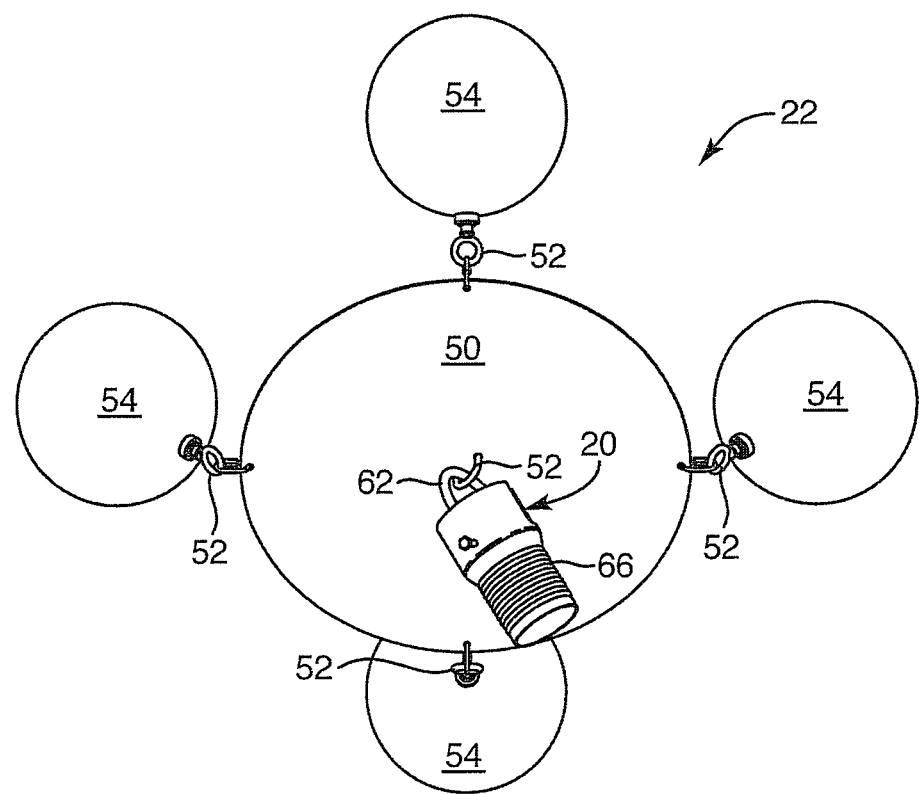
FIG. 16 is a lower quarter perspective view thereof, illustrating the attachment of the snorkel head thereto.
Figure 17:
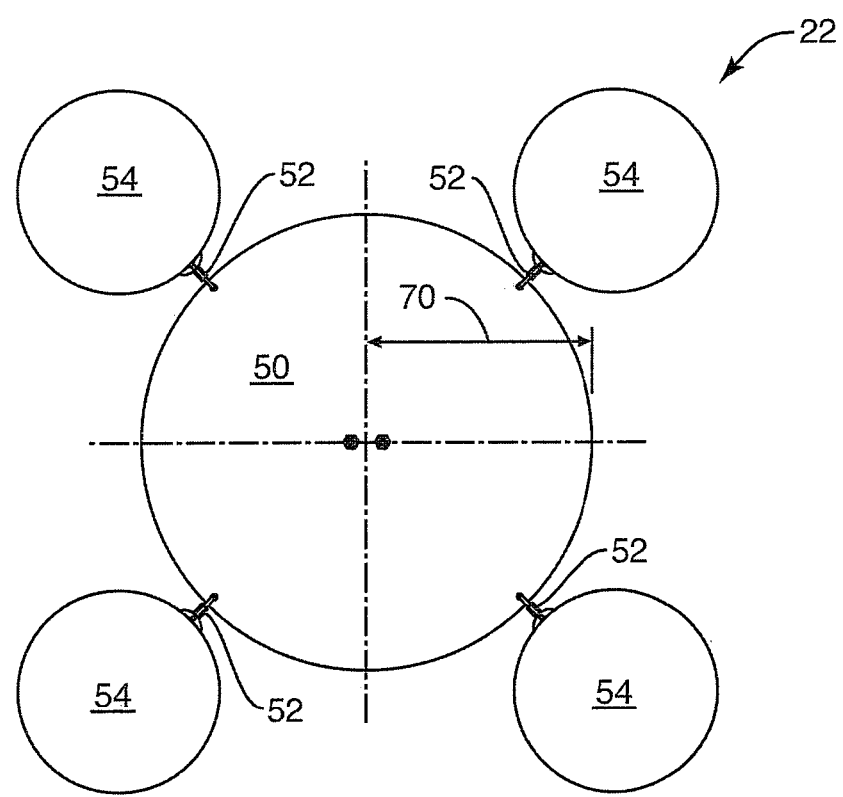
FIG. 17 is a top plan view thereof.
Figure 18:
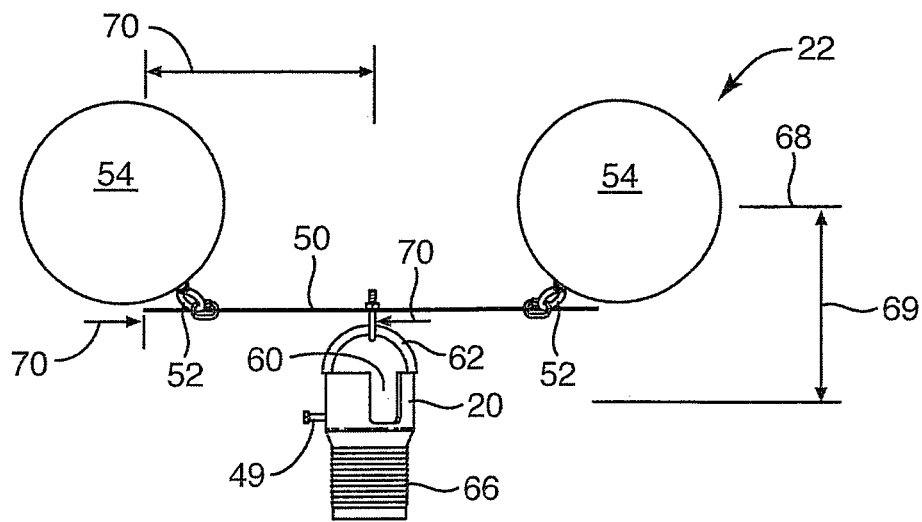
FIG. 18 is a side elevation view thereof, with the snorkel head descending directly and vertically upward, or downward.
Figure 19:
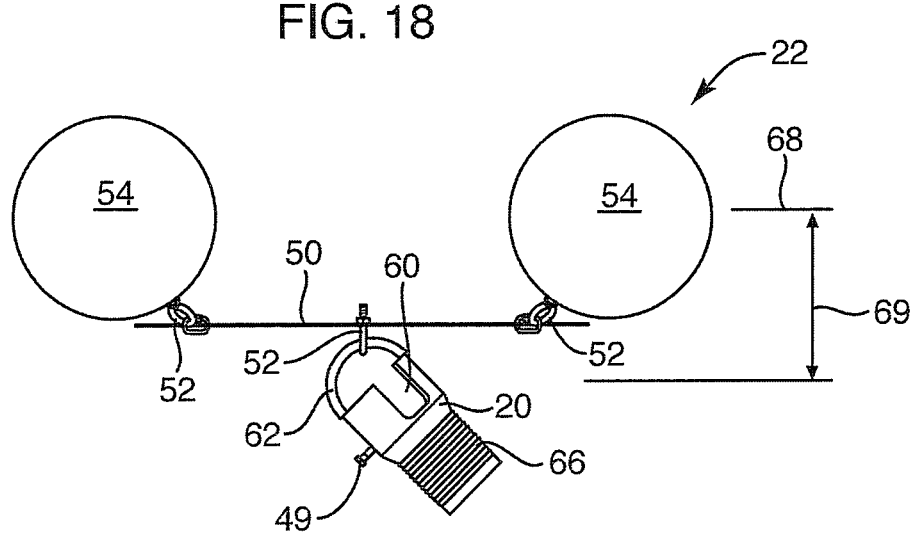
FIG. 19 is a side elevation view thereof with the snorkel angled at about a forty five degree angle from horizontal.
Figure 20:
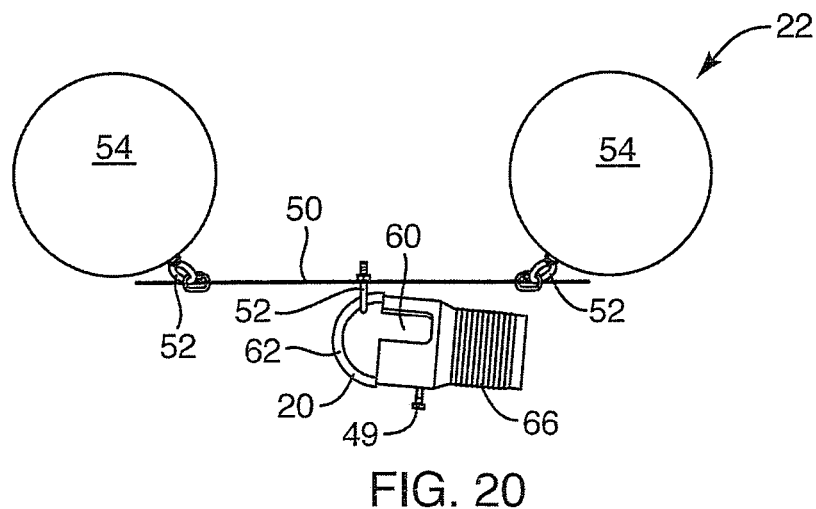
FIG. 20 is a side elevation view thereof illustrating the snorkel in a virtually horizontal orientation.
Figure 21:
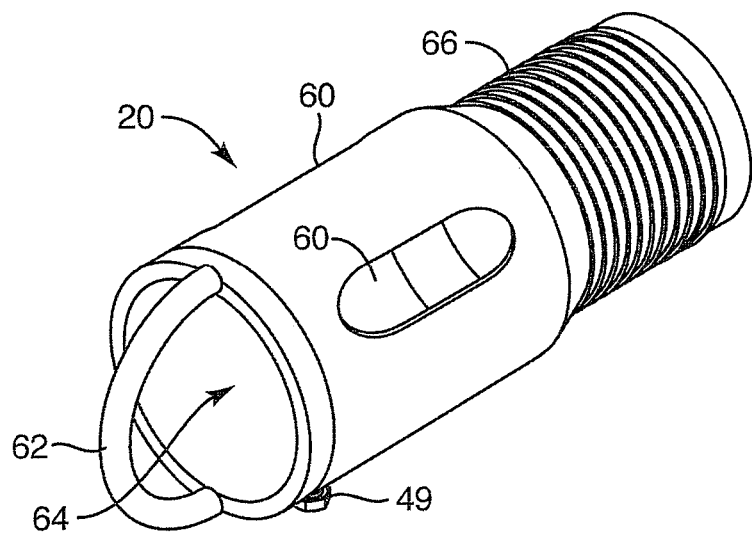
FIG. 21 is a perspective view of an alternative embodiment of a snorkel head.
Figure 22:
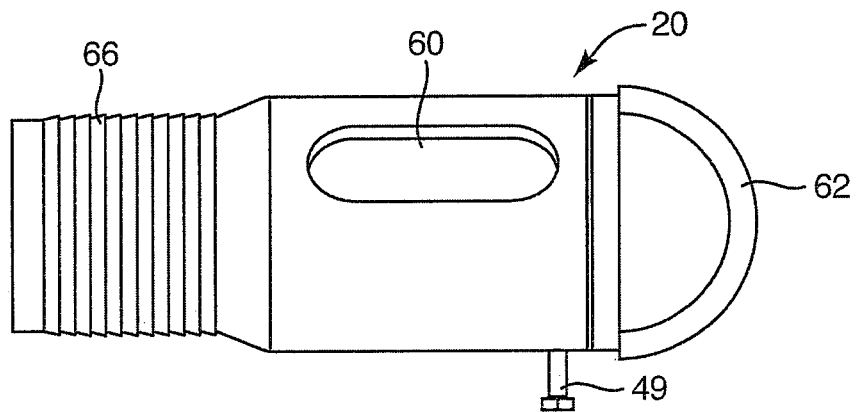
FIG. 22 is a side elevation view thereof.
Figure 23:
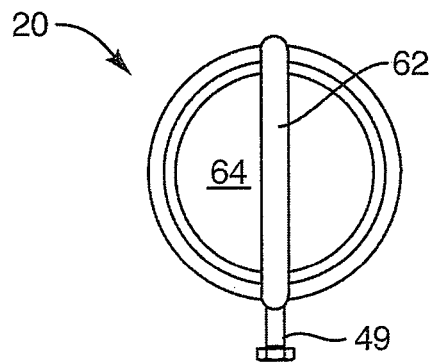
FIG. 23 is an end elevation view thereof.

For example, referring to FIGS. 5 and 6 as well as FIGS. 15-20, the links 52 suspend the plate 50 some distance below the buoys 54. Meanwhile, the buoys 54 provide a density difference or displacement of the liquid in the oil layer 30. Buoyancy lifts or floats the plate 50 or synthetic depth device 50 and the head 20 suspended therebelow.

The effective location through which the apertures 60 or ports 60 in the head 20 receive fluid (liquid, oil) may be limited to the open channel 64 about which the ring 62 or connector 62 secures the head 20 to the plate 50. The apertures 60 may actually be cut into the head 20 from the opening of the channel 64 at the distal end of the head 20 and snorkel system 12.

Nevertheless, experiments with a system 10 in accordance with the invention have demonstrated that apertures 60 on the upper half of the walls or sides of the head 20 have proven effective to accomplish two functions or features. First, they provide a new direction from which oil can flow more freely. For example, requiring oil to flow from a location toward the back end 28b of the trailer tank 14, requires a change of direction of almost 180 degrees to enter the channel 64. In contrast, by positioning the aperture 60 on the outer surfaces or sides of the head 20 provides for direct flow of oil from beside the head 20 into the channel 64 through the apertures 60 or ports 60.

A second benefit of the positioning of the apertures 60 is to keep them above the bottom half or the lower side of the head 20 as the head 20 descends within the tank 14. The standoff 49 restrains the head 20 against moving too close to the floor 35 of the tank 14. Likewise, the location of the apertures 60 on the upper half or the top side of the head 20 assists in limiting flows thereinto from drawing in from below. This is very important when water layer 32 is gone, leaving only the bottoms 34 below the oil 30.

The barbs 66 on the head 20 insert into the distal end of the line 18, thereby facilitating securement of the head 20 to the line 18. Bands 48 draw tightly around the line 18 and underlying barbs 66. The variable diameter or radius of the barbs 66 along their length provides for indentation by the barbs 66 into the line 18, under the compressive loading of force applied by the bands 49. Thus, just as the line 18 secures to the barbs 46 of the adapter 40, the line 18 secures to the barbs 66 of the head 20. The connection is liquid tight.

Referring to FIGS. 7 through 23, while continuing to refer generally to FIGS. 1 through 33, a liquid level 68 lies above a plate 50 or synthetic depth device 50. The buoy system 22, corresponds to and rides near the liquid level 31 of the oil layer 30 in the tank 14. The effective depth of the head 20 is a calculated or hypothetical value.

For example, from a fluid mechanics standpoint, the head 20 has an effective aperture center or an effective center for the apertures 60 receiving fluid thereinto. Such an effective center may be calculated according to rules of fluid mechanics in any suitable engineering book on the topic. This provides an effective center, and therefore a hypothetical centroid from which we may measure depth or effective depth.

Meanwhile, the level of the plate 50 or synthetic depth plate 50 is also located at some distance below the liquid level 68 or top 31 of the oil layer 30. The actual depth 69 of the centroid or effective center of the head 20 or the apertures 60 of the head 20 is a physical dimension. It may be calculated, measured, and generally known by calculating a hydraulic diameter.

However, in order to protect pumps and other equipment downstream, as well as the efficiency of flow and pumping, it is best that no air whatsoever be drawn into the head 20 from the vapor space 36 above the oil layer 30. To that end, it is important to provide a sufficient depth effective below the surface 68. There the apertures 60 will be located. More will be discussed on this topic hereinafter.

Meanwhile, suffice it to say at this point that the radius 70 of the plate 50 or synthetic depth device 50 is determined according to an effective distance, and a traveling equivalent to a required depth. In other words, depth has several influences on a fluid including static pressure or pressure head caused by submersion to a depth. Likewise, the fluid drag within a continuous body of fluid is another factor.

Meanwhile, the change in cross sectional area available for flow from a large surrounding region into an aperture 60 is a necessary reduction in cross sectional flow area. This has associated with it an increase in velocity as fluid approaches the apertures 60. Meanwhile, turns, obstructions, and the like add hydrodynamic drag. Drag influences pressure differentials between various locations and an aperture 60 or multiple apertures 60. Flow must travel a certain distance from the free bulk of the fluid in the oil layer 30 to such apertures 60.

Thus, the position of the plate 50 below the liquid level 68, the distance 69 of the effective centroid of the apertures 60 below the surface 31, 68 of the oil layer 30, and the radius 70 of the plate 50 all contribute to the effective depth engineered for fluid flow of air 36. That is to entrain air 36 or vapors from the air region 36 of the tank 14, that air must be drawn into a vortex. A vortex is caused by too rapid a flow at too shallow a depth into the apertures 60.

Herein, a synthetic depth is developed that effectively provides the proper flow field of oil 30 toward the apertures 60, while restraining air from entering into a vortex by the positioning and sizing of the plate 50.

Figure 24:
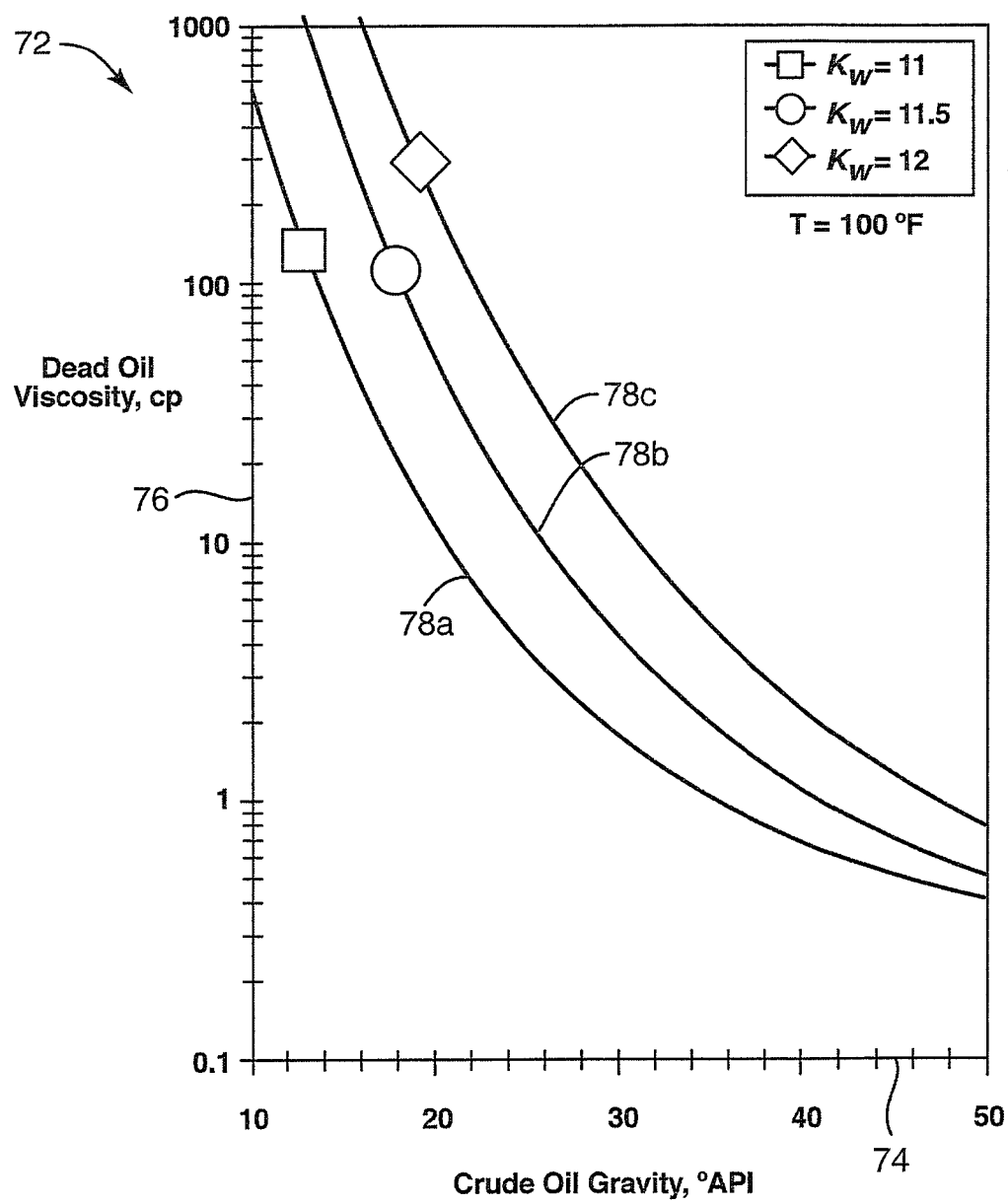
FIG. 24 is a chart illustrating a graph of oil viscosity in centipoise as a function of true crude oil gravity measured in degrees API, the different curves representing different grades and all measurements taken at a uniform temperature, while the baseline viscosity is that of water at twenty degrees centigrade.
Figure 26:
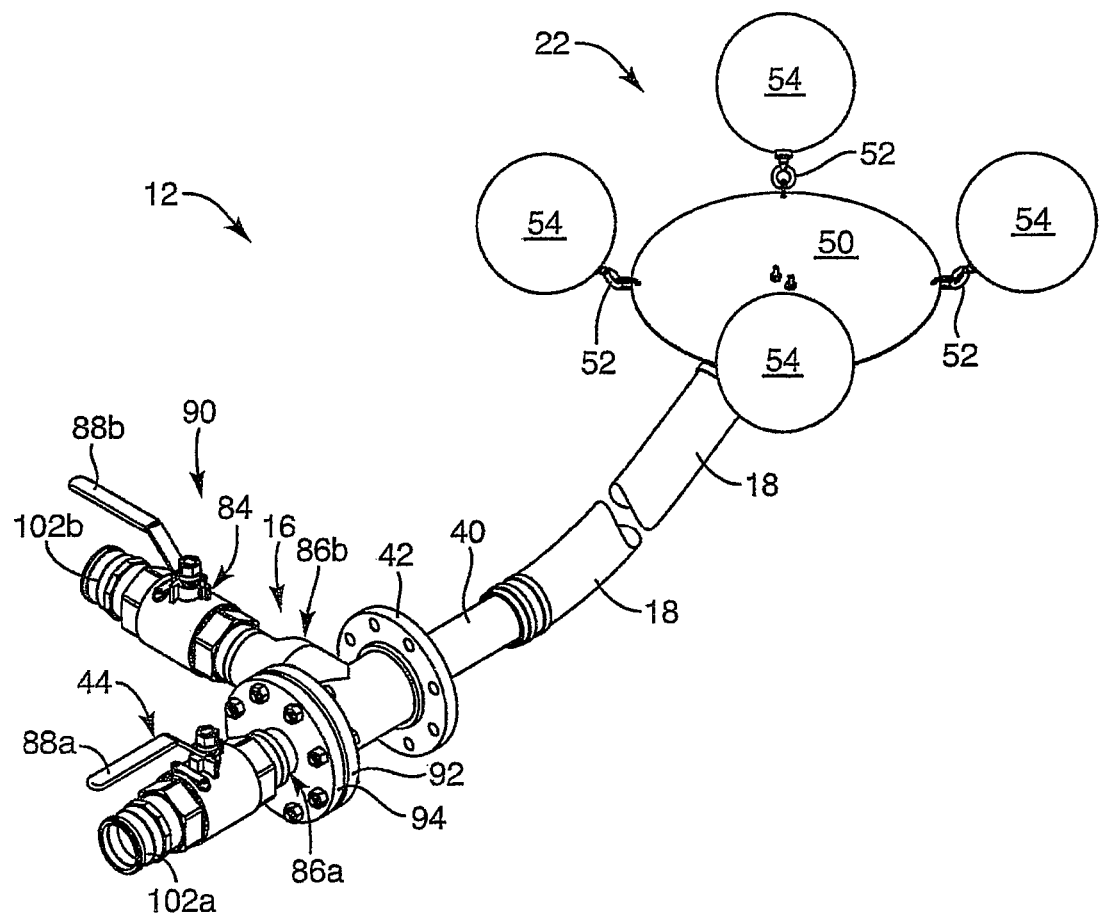
Figure 27:
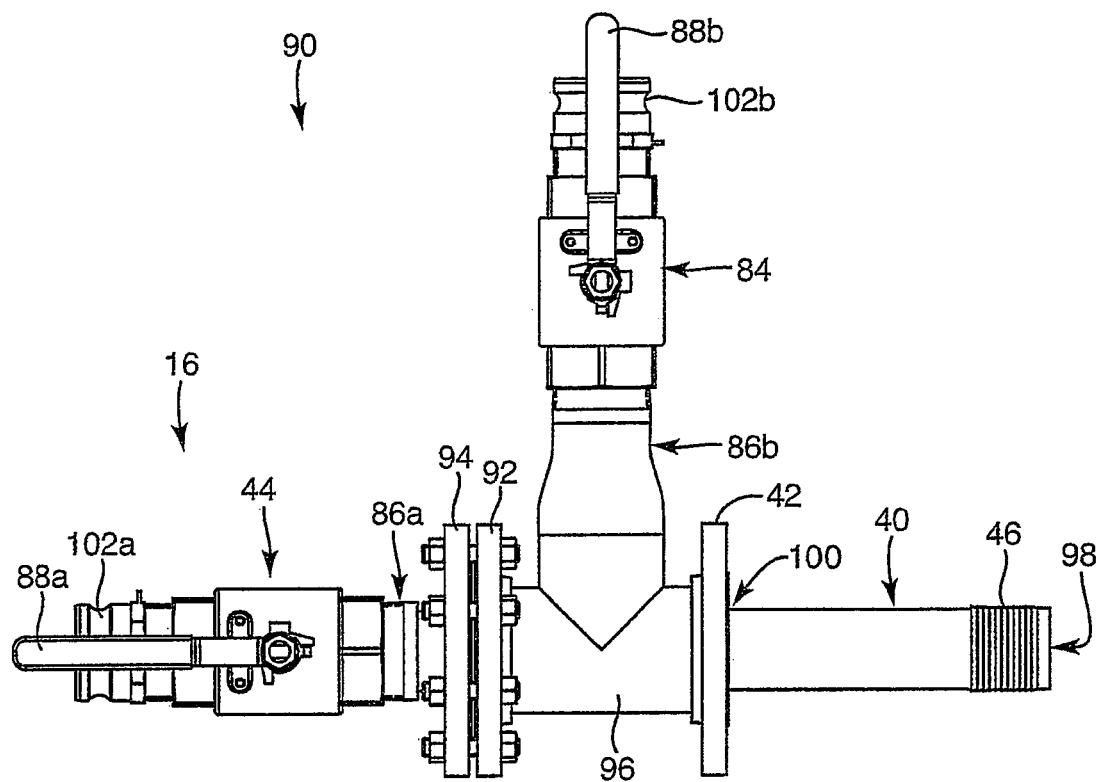
FIG. 27 a top plan elevation view thereof.
Figure 28:
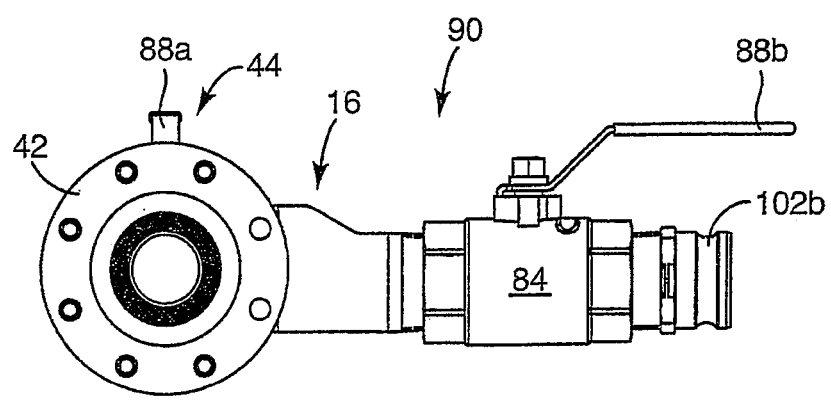
FIG. 28 is a front end elevation view thereof.
Figure 29:
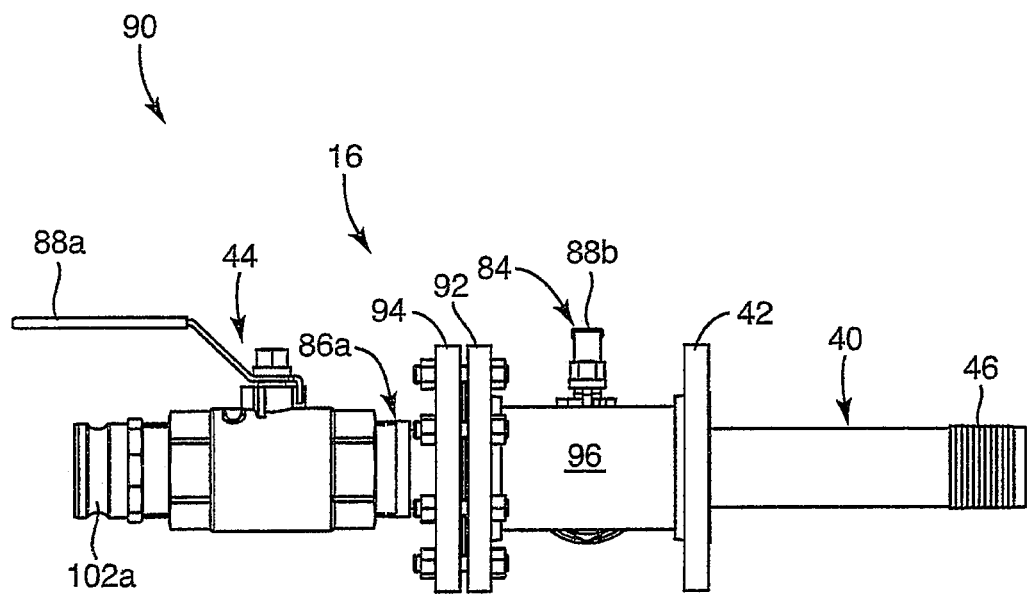
FIG. 29 is a right side elevation view thereof.

Referring to FIGS. 24 and 25, while continuing to refer generally to FIGS. 1 through 25, a chart 72 defines axes 74, 76. The abscissa 74 or horizontal axis 74 represents a property defined or styled as degrees API 74. Degrees API 74 will identify a measurement of certain properties related to viscosity of oil. In reality, degrees API 74 is inversed to specific gravity or density.

The effective viscosity in centipoise is measured along the ordinate 76. The viscosity in centipoise is represented on a logarithmic scale 76 or axis 76, while the degrees API is measured on a linear axis 74.

The different curves refer to different constitutions of oil identified by a K factor. Measurements in the chart 72 are taken at a temperature of 100 degrees Fahrenheit. One will see as the degrees API 74 or the value increases of degrees API 74, the viscosity 76 in centipoise decreases. One will also note that the rate of decrease drops off with increasing value of degrees API 74.

Thus, one will notice that a value of about 1.1 in the dead oil viscosity corresponds to a value of viscosity above that of water. The value of water has a value of one or unity on the vertical axis 76. Most oil of interest in operating a system 10 in accordance with the invention has a degree API value of from about 30 to about 42. The chart 72 demonstrates that values for water will be suitable for approximation of a conservative vortex depth for oil. In other words, because the viscosity of oil is above that of water in the ranges of interest, calculating a vortex depth using the parameters for water, which has a lower viscosity than that of oil, will result in a conservative value for effective vortex depth in oil.

Referring to FIG. 25, while continuing to refer generally to FIGS. 1 through 33, certain equations are published by the American National Standard Institute for hydraulic systems. Standard ANSI/HI 9.8-1998 provides the equation 80a. This equation states that the minimum submergence "s" is equal distance to a diameter, (effective length) of an aperture receiving liquid from a bulk supply thereof. Plus an expression that is proportional to the flow rate in units of volume per second divided by a power 1.5 of the diameter.

In such an equation, the velocity is equal to the flow rate "Q" divided by the cross sectional area determined from the diameter "d." The volumetric flow rate divided by the cross sectional area is the velocity "V." In the equation 80a, the units are meters for distance, square meters for area, cubic meters for volume, and so forth. Meanwhile, the time dimension is measured in seconds.

Equation 80b provides another form of equation 80a. It uses English units including inches for distance, gallons per minute for volumetric flow rates, and so forth. Thus, area "A" is measured in square inches, whereas a perimeter or wetted perimeter "P" is measured in inches.

Incidentally, or perhaps importantly, diameter is effective diameter or hydraulic diameter. Hydraulic diameter is an important parameter for irregular shapes. In engineering fluid mechanics, a hydraulic diameter is the effective diameter. Hydraulic diameter is defined as four times the cross sectional area of a flow region divided by the wetted perimeter of that flow region, or the "circumferential" measurement about the shape of that cross sectional area. Thus, circular, rectangular, star shaped, irregularly shaped, and other shapes of cross section may be evaluated and their effective diameters determined.

The diameter 70 of the plate 50 or synthetic depth device 50 is determined from a combination of actual depth 69 and the effective depth. These depend on depth and distance that flow must traverse to arrive at the centroid or effective opening of the apertures 60. Meanwhile, velocities, areas, and so forth relate to the apertures 60, and are defined thereby. Thus, application of the equation 80b to a system 10 in accordance with the invention has provided an effective diameter 70 of about 15 inches. In practice, this diameter may be increased, but may only be decreased if flow rates are adjusted accordingly.

One may see from the equations 80 that the effective depth or the submersion "S" is directly proportional to diameter at a first order. It is also proportional to an inverse 1.5 power of diameter. The submersion depth is also directly proportional to the volumetric flowrate. However, the addition of multiple terms means that if either the first or second term in the equation 80b becomes disproportionate with respect to the other term, these linear proportionalities may distort and no longer be direct.

Referring to FIGS. 26 through 29, while continuing to refer generally to FIGS. 1 through 33, an adapter 16 may connect to a line 18 and head 20, as discussed hereinabove, sustained by a buoy system 22. However, at the bottommost region of a snorkel system 12 or general separator system 10 in accordance with the invention, the adapter 16 is located to act as a drain system 16 through a penetration in a tank 14 or tank trailer 14.

Accordingly, the flange 42 may connect to a matching portion of a tank 14. Here, however, the fitting 40 or adapter 40 operates as a conduit 40 conducting fluids from the top of the tank 14. Near the top of the liquid level 68 thereof, by way of the head 20, the attached line 18 passes through the layers 30, 32, 34. The conduit 40 or adapter 40 defines a passage way passing completely through the adapter 16, to arrive at a valve 14 controlling flow therethrough.

However, in contrast to such an arrangement, standing alone, the adapter 16 illustrated here also defines a second passage 100 and second valve 84. The first valve 44 effectively defines a first leg 86a for draining material from the tank 14. That first leg 86a is conducting and controlling flow exiting the tank 14 through the head 20 and connected line 18.

In contrast, a second leg 86b of the adapter 16 connects to an annular region 100 surrounding the inner conduit 40. For example, the adapter 40 adapts the overall adapter system 16 to receive the line 18 over the barbs 46 or convolutions 46 as described hereinabove. However, the annular region 100 surrounding the conduit 40 is defined by an overall housing 96 of the adapter 16. The housing 96 may be thought of as defining the two legs 86a, 86b.

Meanwhile, each of the valves 44, 84 has an associated handle 88a, 88b, respectively or actuator 88a, 88b, respectively. In other words, an actuator 88 may be an electrical or mechanical servo controller 88, or a manual handle 88. Herein, trailing reference letters on a reference numerals indicate specific instances of the item defined by the reference numeral.

Together, the combination of the legs 86 and valves 44, 84 with their associated plumbing and controls represent or constitute a fractionator 90. The fractionator 90 provides for dividing out various fractions of the content of the tank 14. In other words, the fractionator 90 may connect by the flange 42 to a wall of a tank 14. Meanwhile, a flange 92 may act as a stop for the annular region 100, while allowing passage therethrough of the inner conduit 40.

In an alternative embodiment, a flange 94 connected to a flange 92 may actually provide the stop. As a practical matter, something must support the inner conduit 40 passing through the flange 92. If the conduit 40 or adapter 40 is welded into the flange 94, then a proper seal between the flanges 92, 94 may act as the seal to seal the annular region 100. This is one of the simplest constructions since the conduit 40 simply passes freely through the annular region 100, and the housing 96. In such an embodiment, the leg 86b becomes the only exit for the annular region 100 or annulus 100.

The conduit 40 defines an internal passage 98. Thus, the lumen 98 may be thought of as a conduit 98, or simply the passage or cavity 98 through the inner wall of the adapter 40 or conduit 40. It is not uncommon to speak of a channel 98 defined by a conduit 40. It is not uncommon also to speak interchangeably of the mechanical conduit 40 and the passage 98 by the same term. That is, it is well understood that the purpose of the conduit 40 is to create the channel 98. The mechanical device may be called either.

Similarly, the housing 96 and the conduit 40 define the annulus 100. It is completely separate and isolated passage 100 directly accessing materials near the bottom of the tank 14. Meanwhile, the conduit 40 accesses only liquids received through the line 18 and snorkel head 20 from near the liquid level 68 or top liquid surface 68 in the tank 14.

Figure 30:
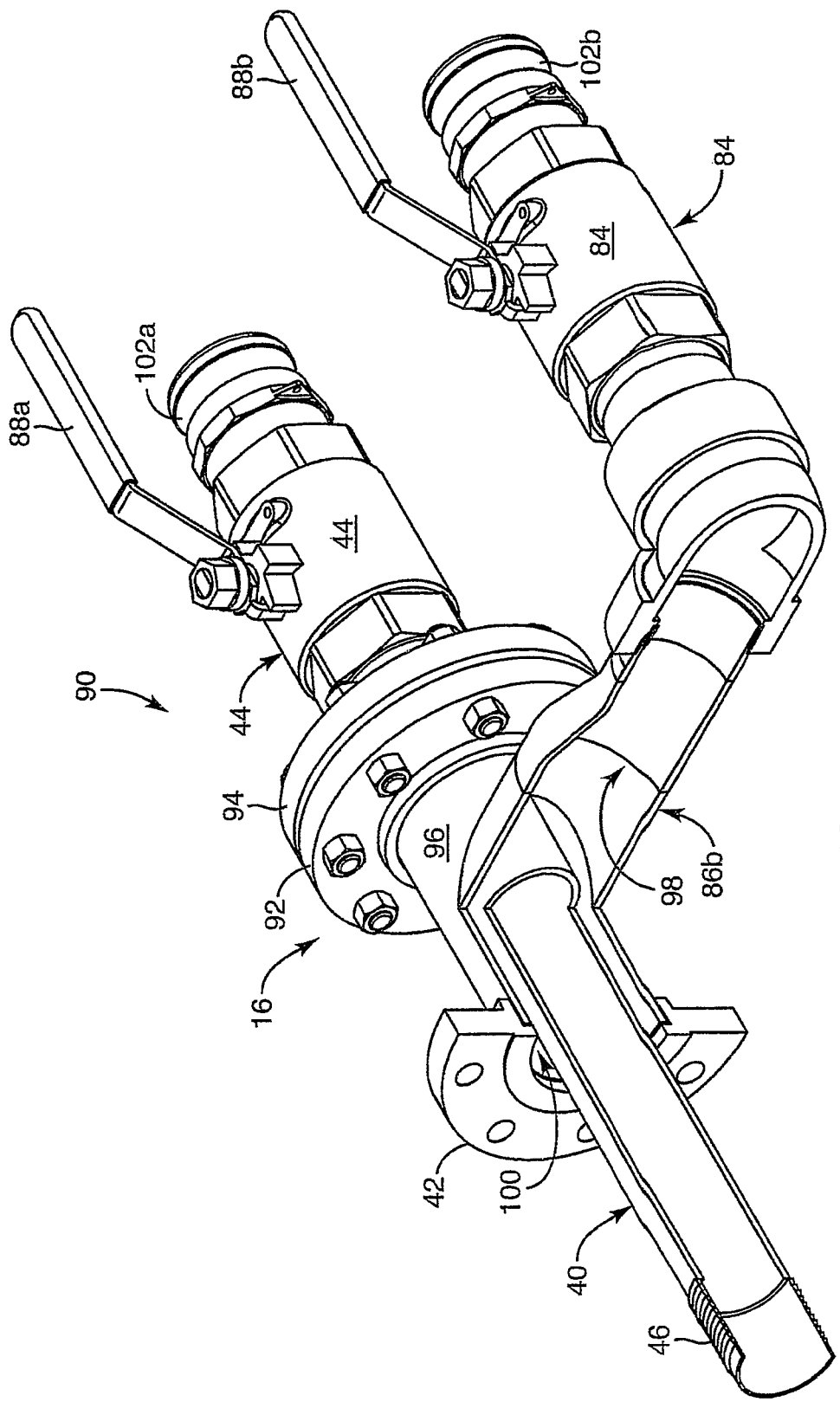
FIG. 30 is a partially cut away, perspective view of an alternative embodiment of an adapter providing an inner conduit and an outer, annular conduit for receiving two flows from different locations, one through a snorkel from near the top of a tank, and one from the bottom of the same tank.
Figure 31:
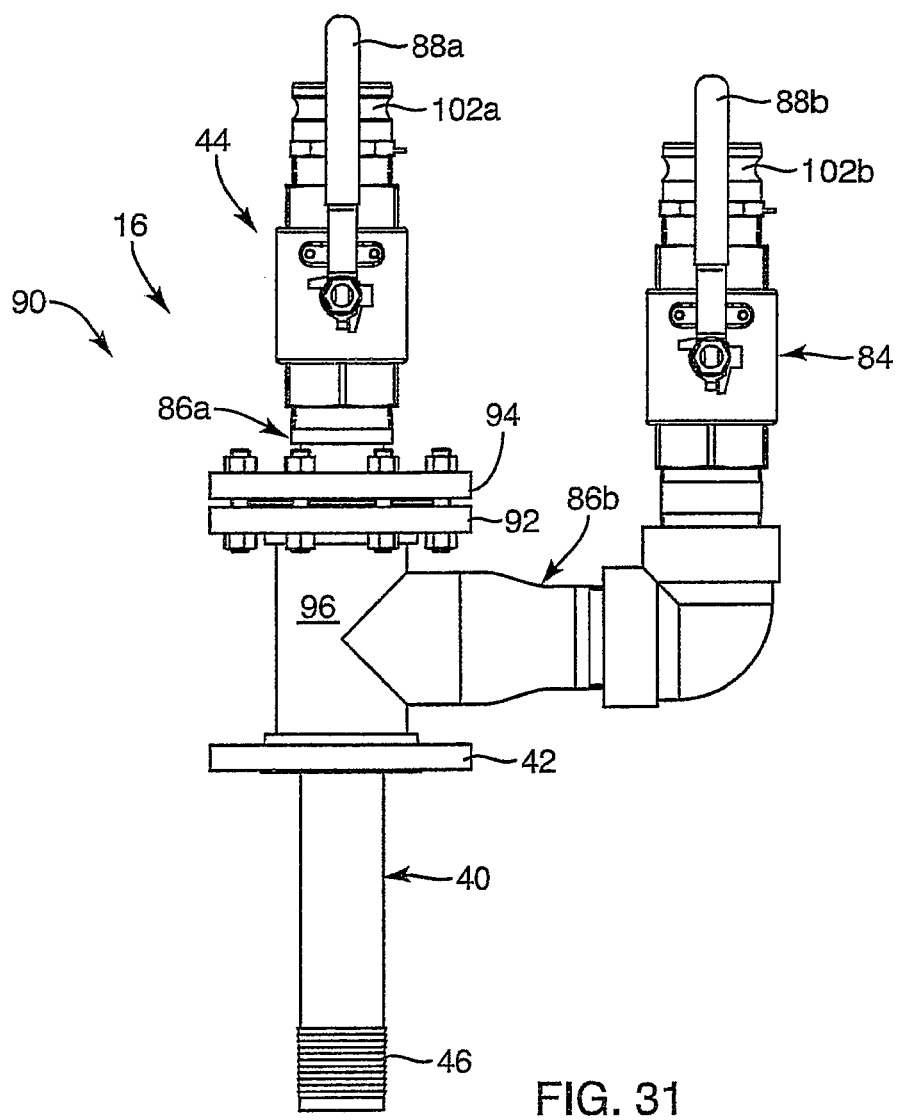
FIG. 31 is a top plan view thereof.
Figure 32:
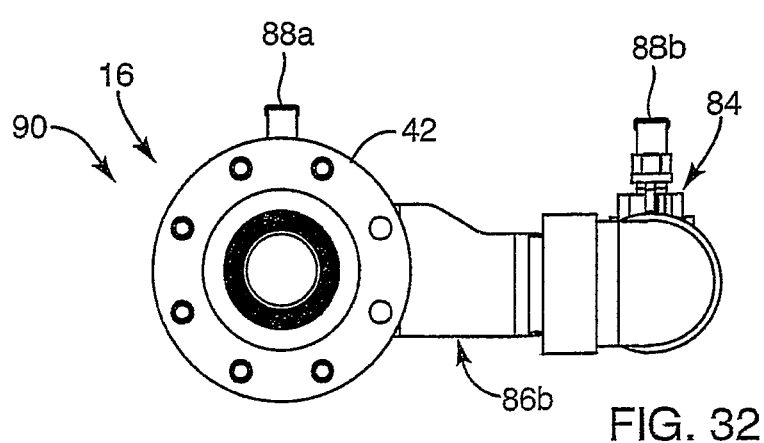
FIG. 32 is a front end elevation view thereof.

Referring to FIGS. 30 through 32, while continuing to refer generally to FIGS. 1 through 33, in certain embodiments, the connectors 102a, 102b may run effectively parallel to one another. For example, in FIGS. 26 through 29, the connectors 102a, 102b correspond to the legs 86a, 86b. Accordingly, each of the connections 102a, 102b may be thought of as a conduit 102, tube 102, receptacle 102, or the like. Ultimately, flows through each of the connectors 102a, 102b each travel to a separate container receiving that respective flow through the corresponding valve 44, 84, respectively.

In the embodiment of FIGS. 30 through 32, the leg 86b connects to various plumbing fixtures in order to redirect the flow contained in the annulus 100 out through the connector 102b running parallel to the connector 102a.

Meanwhile, one can see that the tank bottoms 34 may pass directly from the interior of the tank 14 into the annulus 100, and out the leg 86b controlled by the valve 84. Ultimately, whenever the tank bottoms 34 are desired to be drained, they may be left until the tank 14 is empty of other contents. The snorkel system 12 effectively drains the desirable oil from the upper reaches of the tank 14, and subsequently any water layer 32 thereafter.

Once these over layers 30, 32 have been removed, the tank bottoms 34 may be dislodged. That may require spraying with high velocity steam, hot water, or the like as necessary. Sometimes, chemical compositions may be engaged to further dislodge the tank bottoms 34 or sludge 34 from the tank 14.

Once the sludge 34 has been rendered fluid, the valve 44 having been previously closed, the sludge 34 may be drained. Sludge may then pass through the annulus 100 and out the leg 86b controlled by the valve 84, once opened. Optionally, a pond, a tank, another truck, or other container may connect to the tank 14 by the connector 102b. An intervening line therebetween drains off the sludge 34 or tank bottoms 34.

A significant advantage of a fractionator 90 in accordance with the invention is that the oil lines or the line 18 and its corresponding conduit 40 or adapter 40 need not ever be exposed to tank bottoms 34. Moreover, the valve 44 need not be exposed to tank bottoms 34. Also, the valves 44, 84 may remain connected at all times, while the cycles of filling, settling, draining, and the like continue. The liquid oil layer 30 and the liquid water layer 32 may refill, settle, and drain as often as desired. Meanwhile, the tank bottoms 34 may collect, quiesce, settle out, and otherwise accumulate at the floor of the tank 14.

Periodically, the liquids 30, 32 may be drained, typically much more frequently than the tank bottoms 34. That sludge 34 must be dislodged and rendered flowable or fluidized to be drained out the annulus 100 and through the valve 84 to a waiting receptacle where the receiver connected to the connector 102. Thus, theoretically, the connector 102 is a receiver that receives the flow out of the annulus 100. However, it is contemplated that an initial receiver may be another tank, trailer, or the like for hauling the sludge 34 away for final processing or other disposition.

Figure 33:
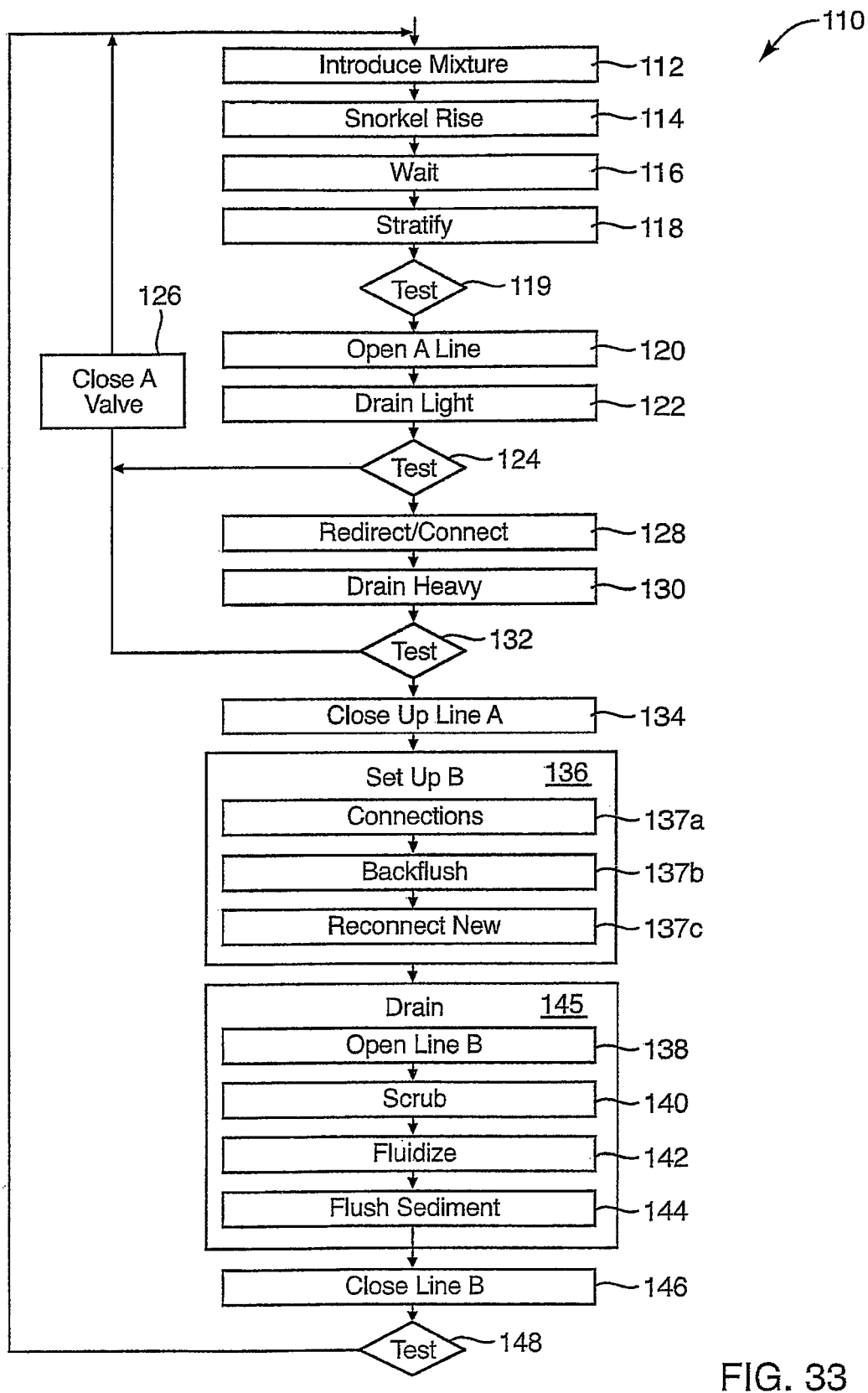
FIG. 33 is a schematic block diagram of a process for operating a separation system in accordance with the invention.

Referring to FIG. 33, while continuing to refer generally to FIGS. 1 through 33, a process 110 is illustrated for operating a tank 14 in accordance with the invention. The process 110 may include introducing 112 a mixture of oil, water, basic sediments, and the like. This mixture may be production fluids or rejected material from previous separation processes. As the introduction 112 continues, the liquid level 68 in the tank 14 will rise, causing the snorkel head 20 to rise, lifted by the buoy system 22.

After filling is complete and waiting 116 for some period of time, stratifying 118 occurs. Thus, the oil layer 30, water layer 32 and the bottoms layer 34 become established.

Periodically, opening 120 the valve 44 effectively opens 120 the line 18 to drain. Accordingly, the light species 30 is drained 122. Typically, in a petroleum production scenario, the light layer 30 is an oil layer. Accordingly, draining 122 the light species 30 may be done periodically while allowing the heavy layer 32 to accumulate. Therefore, a test 124 determines whether sufficient accumulation of the heavy species 132 has occurred.

Efficiency dictates that the accumulated heavy layer 132 should not become too large a fraction, as engineered for the tank 14 by the operating engineer. Accordingly, if the test 124 determines that a sufficient quantity of the heavy species 132 has not been accumulated, then the valve 44 is closed 126 and the tank 14 continues to accumulate the layers 30, 32, 34 from the mixture by returning to step 112 of introducing 112 more of the mixture.

However, if the test 124 determines that sufficient quantity of the heavy species 132 has been accumulated, then the valve 44 may not be closed 126 for long. Instead, the connector 102a may be reconnected or redirected 128 to a different terminal disposition or tank. Then, the valve 44 may open 120. Draining 130 may continue for the heavy species 32 out of the tank 14. Again, after draining the heavy species 130 down to about the level of the top of the tank bottoms 34, a test 132 determines whether the tank bottoms 34 have been sufficiently approached.

Also, the test 132 determines whether the tank bottoms 34 have accumulated excessively. If the tank bottoms 34 may be left where they are, then again the process 110 returns to the step 126 closing 126 the valve 44 and introduction 112 of the mixture continues.

Ultimately, there comes a point at which the light species 30 has been drained 122, the heavy species 32 has been drained 130, and the test 132 determines that the tank bottoms 34 need to be removed. At that point, closure 134 of the valve 44 permits a set up 136 of the valve 84.

Set up 136 may include connecting to the connector 102b by other lines, and may include not only connecting 137a but also back flushing 137b through the valve 84 and annulus 100. Back flushing 137b may be important to remove sediments that may have compacted and virtually solidified. Such compaction within the annulus 100, passage 98, or elsewhere in the leg 86 may completely stop outflow.

Following a back flush 137b, reconnection 137c may establish the open pathway from the tank 14. Sludge 34 must be freed from the tank 14 to flow through the annulus 100, and out the valve 84. Beyond the connection 102b sits some other containment or final disposition.

At this point, the opening 138 of the line 84 may not result in flow. Flow should result from or be accompanied by scrubbing 140 or otherwise dislodging 140 the tank bottoms 34. They cling to the walls of the tank 14. Scrubbing 140 may cause or assist in fluidizing 142 the tank bottoms 34. In some embodiments, additional liquid may have to be added. For example, scrubbing 140 may be done, or dislodging 140 may be done, by a comparatively smaller mass of hot steam.

However, fluidizing 142 may involve addition of water in order to better fluidize or render the tank bottoms 34 of lower effective viscosity. More fluidity or cleaning may result from the presence (addition) of other liquids such as solvents. Ultimately, the flushing 144 of the tank bottoms 34 results from the tank bottoms 34 having been fluidized 142, passing out through the annulus 100. The exit path includes the leg 86b by way of the passage 98, to the valve 84, in its open 138 condition, and exiting through the connector 102b toward a final disposition location.

A test 148 determines whether the tank 14 will continue in service. If it is removed from service, then the cleaned tank 14 may be removed, with the valves 44, 84 closed. In fact, the entire fractionator 90 or any other portion of an adapter 16 may be removed, and the tank 14 may be re-purposed. Otherwise, if the test 148 determines that the tank 14 will continue in its current service, than the process 110 refers back to the introduction step 112 and continues.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus operable as a separator comprising:
    a tank defining a bottom, a wall, and a volume therewithin capable of containing a mixture comprising fluids defining a liquid level and including at least two liquids, separable based on a first liquid being lighter and a second liquid being heavier;
    a port penetrating the wall proximate the bottom between the volume and a destination outside the tank;

a line as a conduit having first and second ends, being flexible between the first and second ends thereof, and having a head, suspended by flotation at the first end, capable of following changes in the liquid level by the flotation proximate the liquid level and being open to receive into the conduit a portion of the first liquid from proximate the liquid level as the liquid level changes; and the line, wherein the second end is operably connected to pass content of the conduit out through the port.

2. The apparatus of claim 1, wherein the mixture comprises solid particles.

3. Apparatus of claim 2, wherein the mixture separates over time the solid particles coated with a portion of the fluids, thereby rendering a sludge proximate the bottom.

4. The apparatus of claim 3, wherein the volume contains at least one gas above the liquid level.

5. The apparatus of claim 1, the apparatus comprises an adapter passing through the port, the adapter comprising a central tube sealingly connected to drain the line through the second end and out through the port, and an annulus around the central tube and open to the volume to be capable of draining the volume from proximate the bottom through the port.

6. The apparatus of claim 5, wherein the apparatus relies on buoyancy differences between the first and second liquids to separate them over time and direct them through the central tube and the annulus, respectively.

7. The apparatus of claim 1, wherein the head operates as a snorkel head connected to feed the conduit with a stream continuously flowing from proximate the liquid level as the liquid level drops in response to removal of a portion of the contents of the tank through the port.

8. The apparatus of claim 7, comprising a buoy operably connected to provide the flotation to the snorkel head to resist entrainment of a gas from above the liquid level into the stream by maintaining the snorkel head at an effective head depth below the liquid level.

9. The apparatus of claim 8, comprising a plate, as an obstruction, operably connected to resist entrainment of the gas into the stream by increasing a distance required for the first liquid at the liquid level to travel between a location in contact with the gas and the first end.

10. The apparatus of claim 1, wherein the apparatus is operable on mixtures, containing a plurality of constituents, as one of:
a liquid-liquid separator by installing through the port an adapter having a central channel connected to drain the first liquid from the line and an annulus surrounding the central channel to drain the second liquid therethrough;
a liquid-solid separator by installing the adapter and draining a sludge comprising solid particles in the second liquid and draining the sludge out through the annulus;
a gas-liquid separator by providing a vent in the tank to vent gases accumulating above the liquid line; and
a combination of one or more thereof.

11. A method comprising:
selecting a tank having a port proximate a floor defining a bottom thereof, the tank being capable of receiving, containing, and separating, exclusively under the influence of gravity, a mixture comprising at least two liquids defining a liquid level and separable based on a first liquid being lighter and a second liquid being heavier;

fitting to the port a valve assembly connecting to a snorkel extending from a second end of the snorkel at the valve to a first end of the snorkel, provided with an opening and provided with a structure capable of floating proximate a liquid level established by the mixture in the tank;
adding the mixture to the tank;
waiting a time selected for the first, lighter, material to separate from the second, heavier, material in the mixture; and
draining continually into the opening and out through the valve assembly a lightest portion of the lighter material.

12. The method of claim 11 comprising closing the valve assembly in response to the liquid level dropping to a position corresponding to an unacceptable constitution of the liquid in the tank accessing the opening.

13. The method of claim 11, comprising operating the snorkel and tank to separate the mixture, which also contains solids and gas that accumulates above the mixture in the tank into at least one of:
a liquid-solid separation of species separating solid particles as a sludge below the second liquid after draining the first and second liquids;
a gas-liquid separation of species by venting gases from the tank above the liquid line; and
a combination of two or more thereof.

14. The method of claim 11, wherein the valve assembly comprises an annular passage surrounding a central passage, a first valve capable of controlling streaming of a first flow from the snorkel through the port by way of the central passage, and a second valve capable of streaming a second flow directly from the tank, proximate the bottom thereof, into the annular passage through the port.

15. The method of claim 14, comprising:
operating the first valve to drain the tank of the first liquid meeting a specification for purity;
closing the first valve based on when the snorkel begins draining the first liquid not meeting the specification.

16. The method of claim 15, comprising:
operating the first valve to drain the tank of the first liquid not meeting the specification; and
closing the first valve in response to the second end of the snorkel approaching the second liquid below the first liquid.

17. The method of claim 16, comprising draining the second liquid from the tank by opening the first valve.

18. The method of claim 17, comprising directing the first liquid meeting the specification to a first destination, corresponding to a first disposition;
directing the first liquid not meeting the specification to a second destination corresponding to a second disposition; and
directing the second liquid to a third destination corresponding to a third disposition.

19. The method of claim 16, comprising draining a tank bottoms comprising particulate solids accumulated proximate the bottom of the tank by opening the second valve.

20. A method of removing fluids from a tank, the method comprising:
providing a snorkel connected inside a tank to a port exiting the tank proximate a bottom thereof, the snorkel is structured for being capable of extending continuously from the port at a second end of the snorkel to a liquid level accessible continually by a first end thereof;

adding a mixture to the tank comprising a mixture of at least two liquids defining a liquid level, and separable based on that a first liquid is lighter than a second liquid;

waiting for separation of constituents of the mixture into a vapor, the first liquid, the second liquid, and tank bottoms containing solids as particles;

draining a purest portion of the first liquid continually through the snorkel from proximate the liquid level so long as the purest liquid comports with a specification for purity thereof;

draining a non-compliant portion of the first liquid through the snorkel from proximate the liquid level to proximate a top surface of the second liquid below the first liquid;

draining the second liquid through the snorkel; and draining the tank bottoms through the snorkel.

\* \* \* \* \*